US009031672B2

(12) United States Patent
Yoshinaga et al.

(10) Patent No.: US 9,031,672 B2
(45) Date of Patent: May 12, 2015

(54) LOGIC DIAGRAM PROCESSING DEVICE AND LOGIC DIAGRAM PROCESSING METHOD

(71) Applicants: Mitsunobu Yoshinaga, Tokyo (JP); Tadashi Oi, Tokyo (JP); Shinichiro Tsudaka, Tokyo (JP); Masayo Nakagawa, Tokyo (JP)

(72) Inventors: Mitsunobu Yoshinaga, Tokyo (JP); Tadashi Oi, Tokyo (JP); Shinichiro Tsudaka, Tokyo (JP); Masayo Nakagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 105 days.

(21) Appl. No.: 13/780,837

(22) Filed: Feb. 28, 2013

(65) Prior Publication Data

US 2013/0253667 A1  Sep. 26, 2013

(30) Foreign Application Priority Data

Mar. 26, 2012 (JP) .................................. 2012-068899

(51) Int. Cl.
*G05B 15/02* (2006.01)
*G05B 23/02* (2006.01)

(52) U.S. Cl.
CPC .................. *G05B 15/02* (2013.01); *Y02T 10/82* (2013.01); *G05B 23/0216* (2013.01)

(58) Field of Classification Search
CPC ....................................................... G06F 17/50
USPC ............................................................ 700/17
See application file for complete search history.

(56) References Cited

U.S. PATENT DOCUMENTS

| 5,699,080 A * | 12/1997 | Oshiga et al. ................. 345/157 |
| 8,717,383 B2 * | 5/2014 | Coldicott et al. ............. 345/629 |
| 2003/0237065 A1 * | 12/2003 | Matsuzaki et al. ................ 716/5 |
| 2012/0203775 A1 | 8/2012 | Tsudaka |

FOREIGN PATENT DOCUMENTS

| JP | 5-189508 | 7/1993 |
| JP | 6-223125 | 8/1994 |
| JP | 7-234885 | 9/1995 |
| JP | 9-230915 | 9/1997 |
| JP | 2000-57187 | 2/2000 |
| JP | 2010-244150 | 10/2010 |
| JP | 2012-181821 | 9/2012 |

OTHER PUBLICATIONS

Office Action issued Feb. 12, 2014 in Japanese Patent Application No. JP 2012-068899 (with English translation).

* cited by examiner

*Primary Examiner* — Mohammad Ali
*Assistant Examiner* — John Park
(74) *Attorney, Agent, or Firm* — Oblon, McClelland, Maier & Neustadt, L.L.P.

(57) ABSTRACT

A logic diagram processing device has a logic diagram relocating unit which relocates operation elements while maintaining control logics equivalently so that the operation elements as compared overlap in the case where a plurality of designated logic diagrams are overlapped, and a logic diagram overlapping unit which overlaps the plurality of designated logic diagrams in which the operation elements are relocated by the logic diagram relocating unit. The logic diagram processing device also includes a display unit which displays the plurality of designated logic diagrams overlapped by the logic diagram overlapping unit in a predetermined display method by which a common part or the difference of the operation elements can be discriminated, and a display control unit which switches the predetermined display method to display in the display unit in accordance with an instruction from the outside.

7 Claims, 19 Drawing Sheets

F I G. 3
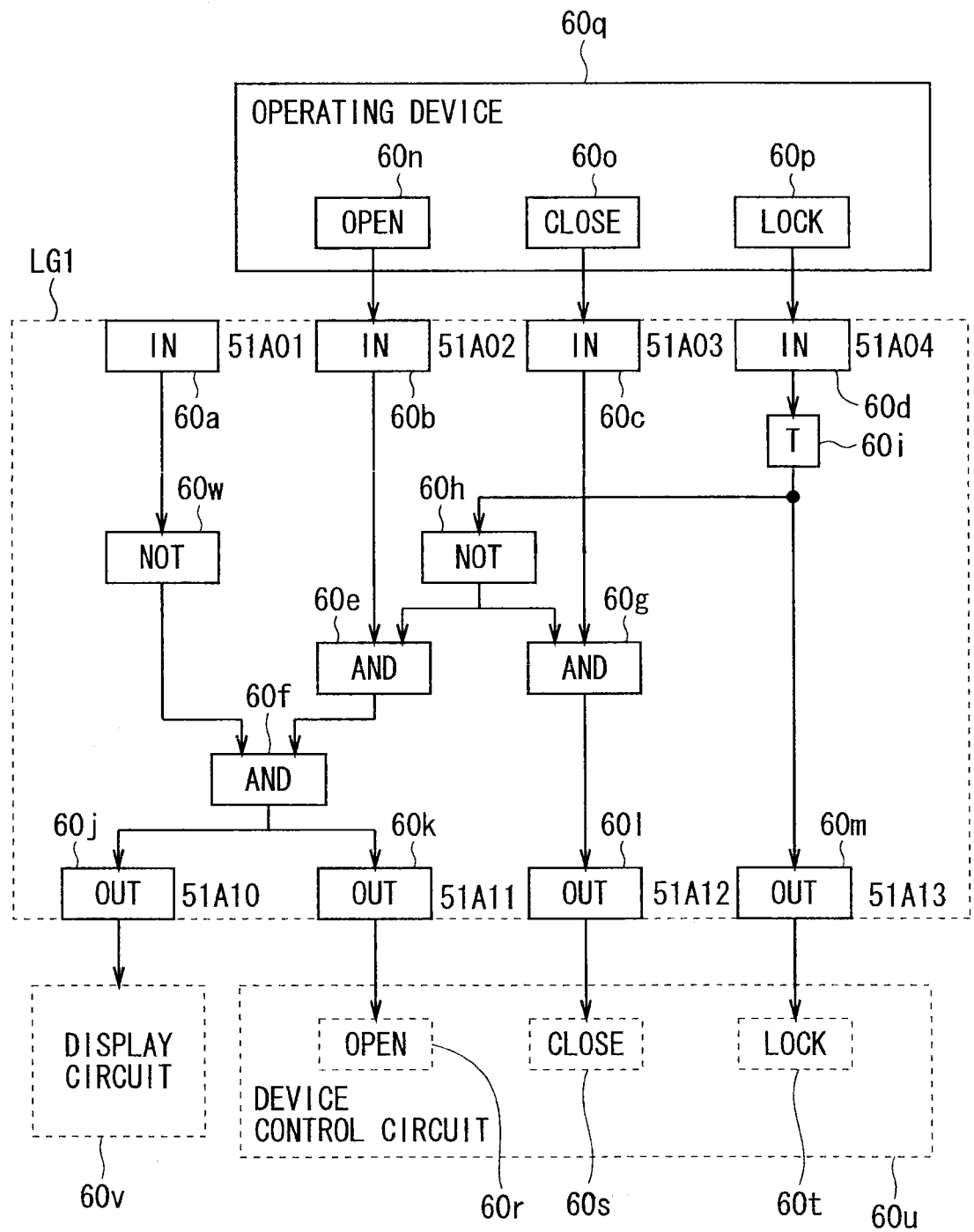

F I G. 4
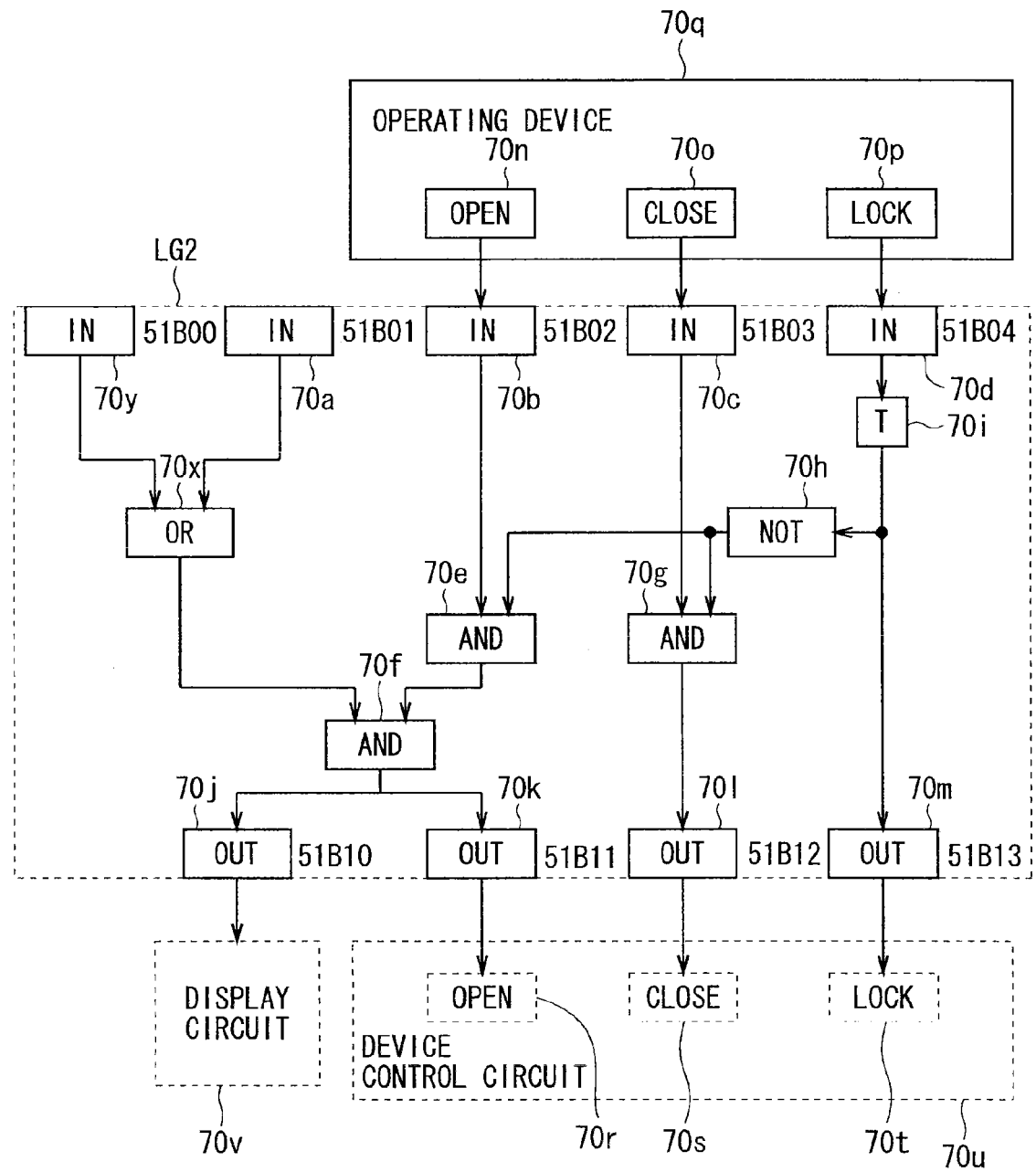

F I G. 1 0
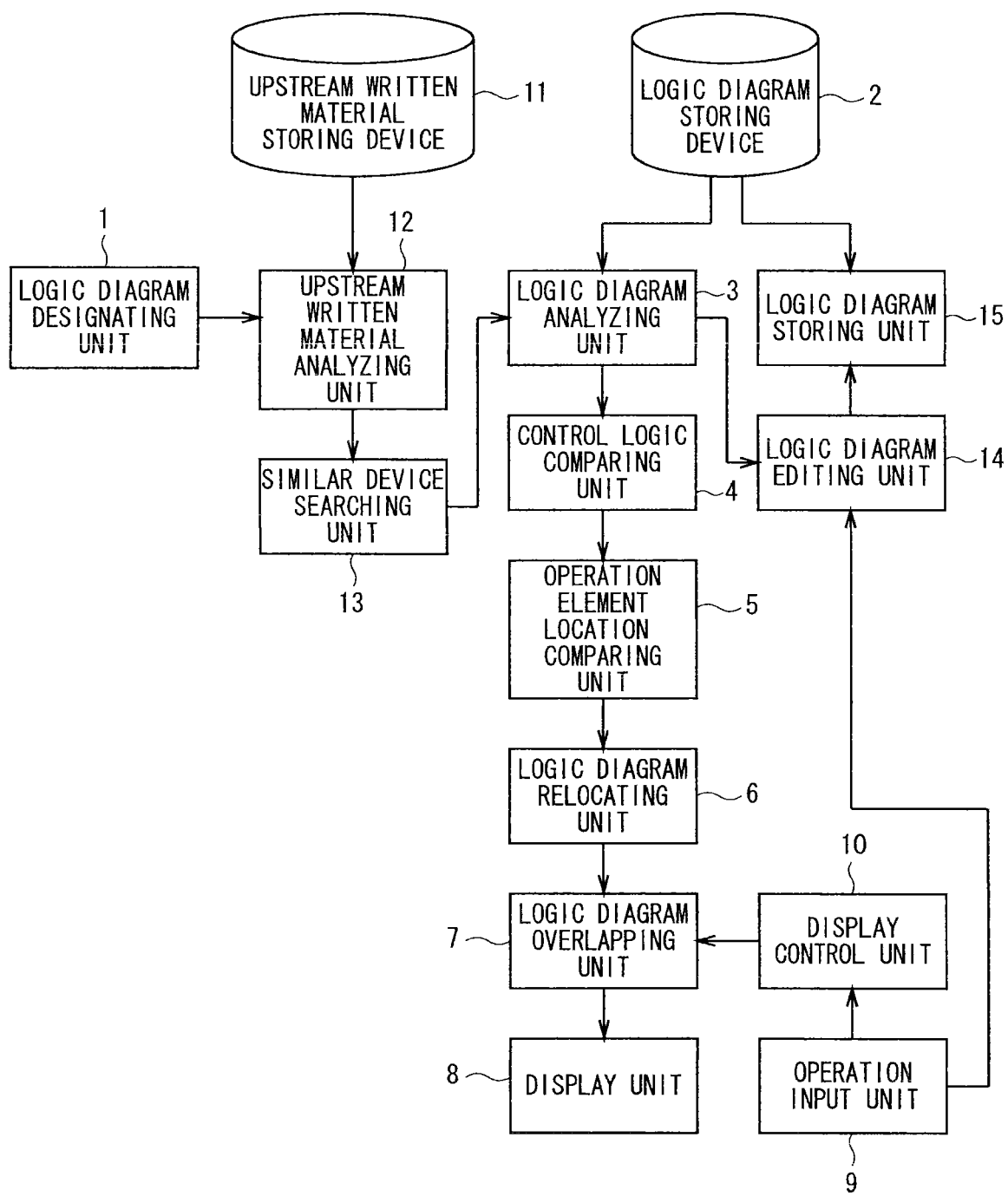

F I G. 1 2

| DEVICE NAME | DEVICE TYPE | CONTROL TYPE | MAKER | MODEL |
|---|---|---|---|---|
| T-001 | TANK | — | COMPANY A | A-001 |
| P-001 | ELECTRIC PUMP A | TYPE A | COMPANY B | B-001 |
| P-002 | ELECTRIC PUMP A | TYPE A | COMPANY B | B-001 |
| P-003 | ELECTRIC PUMP A | TYPE A | COMPANY B | B-001 |
| V-001 | AIR OPERATION VALVE A | TYPE B | COMPANY C | C-001 |
| V-002 | AIR OPERATION VALVE A | TYPE B | COMPANY C | C-001 |
| V-003 | AIR OPERATION VALVE A | TYPE B | COMPANY C | C-001 |
| V-51A | ELECTRIC-OPERATED VALVE A | TYPE C | COMPANY D | D-001 |
| V-51B | ELECTRIC-OPERATED VALVE A | TYPE C | COMPANY D | D-001 |
| V-006 | CHECK VALVE A | — | COMPANY E | E-001 |
| V-007 | CHECK VALVE A | — | COMPANY E | E-001 |
| V-008 | CHECK VALVE A | — | COMPANY E | E-001 |
| . | . | . | . | . |
| . | . | . | . | . |
| . | . | . | . | . |

DC2

F I G. 1 6
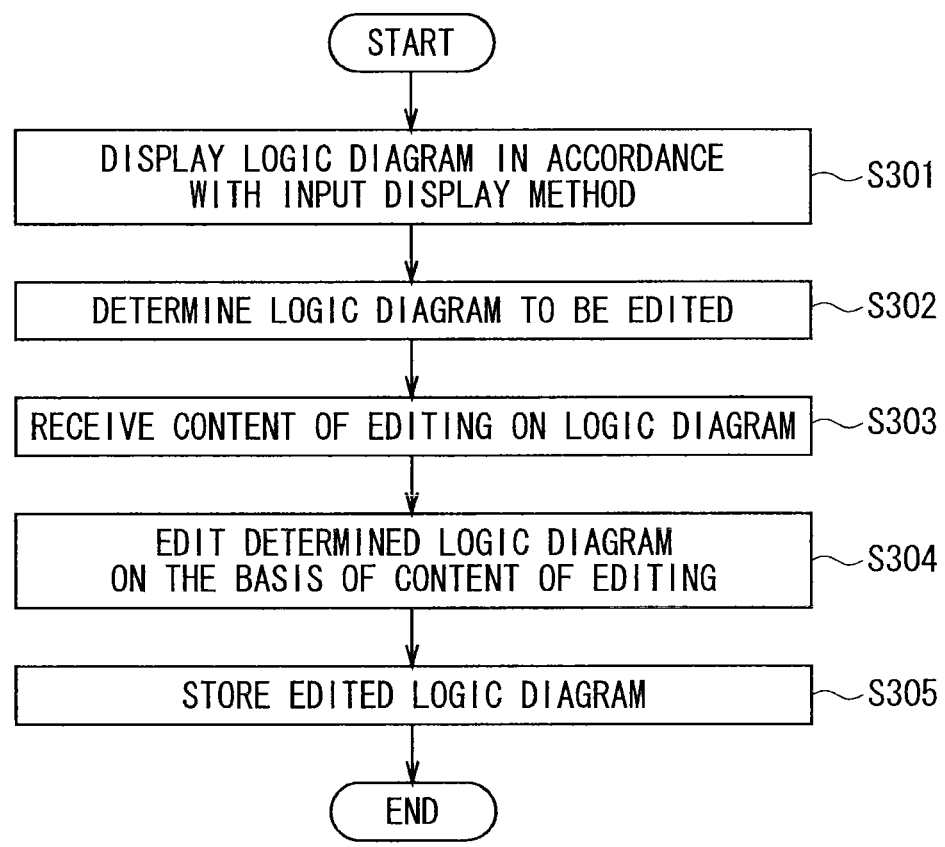

LOGIC DIAGRAM PROCESSING DEVICE AND LOGIC DIAGRAM PROCESSING METHOD

BACKGROUND OF THE INVENTION

1. Field of the Invention

The present invention relates to a logic diagram processing device and a logic diagram processing method for processing a logic diagram expressing content of monitor and control performed on a device by a monitor and control system.

2. Description of the Background Art

A monitor and control system notifies an operator/observer of information from a device to be monitored such as various sensors of temperature, pressure, position, and the like and controls various devices such as a motor, a valve, a switch, and hydraulic equipment by an operation of the operator/observer, and is used in a wide range of fields such as a power generation plant, a chemical plant, power receiving/distributing equipment, and water supply and sewerage systems.

A typical monitor and control system has a plurality of modules divided by processes, for example, performing transmission/reception of signals to/from a device as an object of monitor and control. By connecting the modules via communication paths, various processes are realized.

The processes of the modules in the monitor and control system are often expressed in a digraph in which input/output directions of signals are indicated by arrows like in a circuit diagram. Concretely, a process of each module is expressed by a combination of a node indicative of a signal process (hereinbelow, also called "operation element") and a link connecting nodes and indicating the flow of a signal (hereinbelow, also called "signal line"). The processes of modules are conventionally realized in a fixed manner by hardware circuits. However, from the viewpoints of flexibility and cost performance, in recent years, the case that an operation is mounted as a program on the digital computer and is simulated on a digital computer so that and the process can be realized is increasing.

An example of standards of programming languages expressing a process by an operation element and a signal line is, for example, the international standard IEC61131-3. An operation element is written in the FBD (Function Block Diagram) of the international standard, and a process (control logic) expressed by a combination of an operation element and a signal line is expressed by a diagram called a logic diagram.

In recent years, as the scale of a program is becoming large-scaled, maintenance work such as analysis, addition, and editing of an existing program is becoming difficult. This phenomenon similarly occurs also in generation of a logic diagram expressing monitor and control of a monitor and control system. Concretely, since behaviors corresponding to various modes are written in control logic diagrams, control logics tend to be complicated. In addition, since the number of devices to be controlled is large, the number of logic diagrams controlling the devices is also enormous.

On the other hand, in the logic diagrams, control logics of controlling devices having similar characteristics such as devices of a multiple system are similar and, in many cases, there is only a small difference in control logics, signal names, and the like. Consequently, works such as analysis and editing of a target logic diagram are often performed while comparing and collating a plurality of similar logic diagrams.

Conventionally, in the case of comparing and collating a plurality of diagrams, they are printed on paper or displayed on a display device and compared by the eyes. However, in a pictorial representation language such as a logic diagram, in the case where a diagram is generated without copying or the case where, even diagrams are copied, the copy sources are different, layouts are usually different, and it is difficult to find the difference at a glance. When the number of logic diagrams is not only two but is large such as three, four, ..., it is more difficult to compare and collate them.

The conventional method, therefore, requires long work time for comparison of logic diagrams. There is the possibility of occurrence of a check error and oversight, and the method has a problem that the quality of a control logic generated is low. As described above, in a pictorial representation language such as a logic diagram, there is a challenge to efficiently collate the difference between similar diagrams.

As an example of techniques solving the problem, a technique of expressing a changed part in a circuit diagram is disclosed in Japanese Patent Application Laid-Open No. 05-189508 (1993). A circuit diagram input device disclosed in Japanese Patent Application Laid-Open No. 05-189508 (1993) has an old-version circuit diagram data storage in which data before a change of a part and a signal is stored, a new-version circuit diagram data storage in which data after the change is stored, symbol setting means, change part extracting means, and change part output means.

In the circuit diagram input device described in Japanese Patent Application Laid-Open No. 05-189508 (1993), the change part extracting means compares and collates old-version circuit diagram data and new-version circuit diagram data, and extracts information of a changed part and/or signal as change part data. The change part output means prints or displays each of an old-version circuit diagram and a new-version circuit diagram in which the outer shape of the extracted part and a signal line which is highlighted by a thick line or a dotted line.

However, in the technique, to recognize the highlighted part, a plurality of diagrams has to be displayed and printed. Consequently, display regions by the number of the plurality of diagrams or printing are/is required. As a result, in the case where the number of logic diagrams to be compared is large, a problem occurs such that the diagrams cannot be efficiently compared and collated.

SUMMARY OF THE INVENTION

The present invention has been achieved in consideration of the drawbacks as described above, and an object of the present invention is to provide a technique capable of efficiently comparing and collating a plurality of logic diagrams.

The present invention provides a logic diagram processing device for processing a logic diagram expressing content of monitor and control performed on a device by a monitor and control system, including: a logic diagram designating unit which designates a logic diagram to be displayed; and a logic diagram analyzing unit which analyzes a plurality of designated logic diagrams which are the plurality of logic diagrams designated as objects to be displayed by the logic diagram designating unit. The logic diagram processing device also includes: a control logic comparing unit which compares control logics of the plurality of designated logic diagrams on the basis of an analysis result of the logic diagram analyzing unit; an operation element location comparing unit which compares locations of operation elements disposed on the plurality of designated logic diagrams on the basis of a comparison result of the control logic comparing unit; and a logic diagram relocating unit which relocates the operation elements while maintaining the control logics equivalently so that the operation elements as compared overlap in the case where the plurality of designated logic diagrams are overlapped, on the basis of a comparison result of the control logic comparing unit and a comparison result of the operation element location comparing unit. The logic diagram processing device also includes: a logic diagram overlapping unit which overlaps the plurality of designated logic diagrams in which the operation elements are relocated by the logic diagram relocating unit; a display unit which displays the plurality of designated logic diagrams overlapped by the logic diagram overlapping unit in a predetermined display method by which a common part or the difference of the operation elements can be discriminated; and a display control unit which switches the predetermined display method to display in the display unit in accordance with an instruction from the outside.

By displaying a plurality of logic diagrams in which operation elements are relocated while maintaining control logics equivalently and which are overlapped in a predetermined display method by which a common part or the difference of the operation elements can be discriminated and switching the predetermined display method in accordance with an instruction from the outside, a plurality of diagrams can be efficiently compared and collated. Therefore, time for comparison and collation can be reduced and a human error in a comparing operation can be prevented, so that the quality of monitor and control process can be also improved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram illustrating an example of a logic diagram LG1;

FIG. 4 is a diagram illustrating an example of a logic diagram LG2;

FIG. 10 is a block diagram illustrating the configuration of a logic diagram editing device according to a second embodiment;

FIG. 12 is a diagram illustrating a device specification list;

FIG. 16 is a flowchart illustrating the operation of the logic diagram editing device according to the second embodiment;

DESCRIPTION OF PREFERRED EMBODIMENTS

First Embodiment

Figure 1:
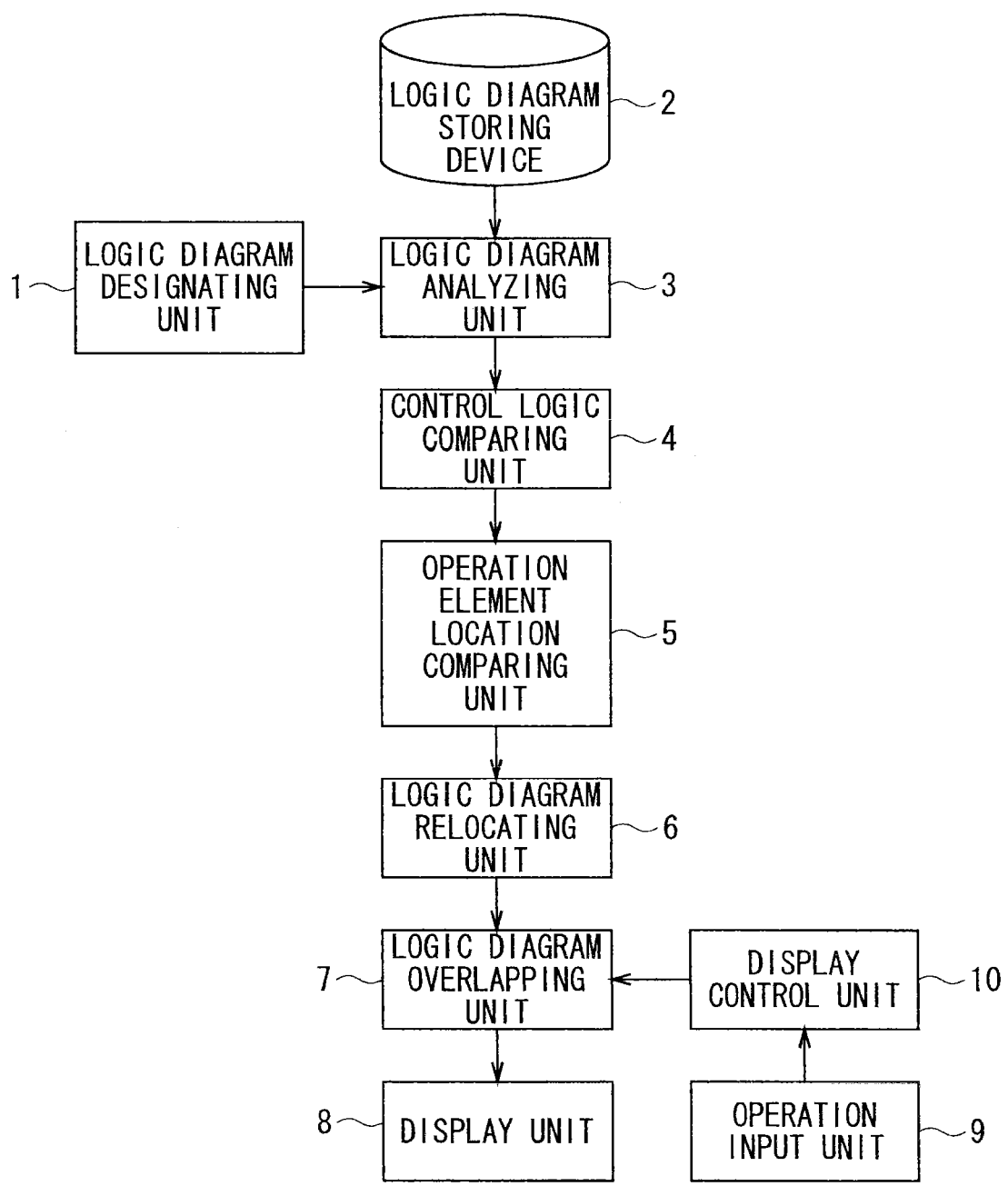
FIG. 1 is a block diagram illustrating the configuration of a logic diagram display device according to a first embodiment.

FIG. 1 is a block diagram illustrating the configuration of a logic diagram display device (logic diagram processing device) according to a first embodiment. In the first embodiment, the contents (control logics) of monitor and control performed on devices by a monitor control system are illustrated in logic diagrams, and the logic diagram display device of the preferred embodiment is a device for displaying a plurality of logic diagrams. The logic diagram will be described in detail later.

As illustrated in FIG. 1, the logic diagram display device of the preferred embodiment has a logic diagram designating unit 1, a logic diagram storing device 2 storing logic diagrams of a plurality of devices, a logic diagram analyzing unit 3, a control logic comparing unit 4, an operation element location comparing unit 5, a logic diagram relocating unit 6, a logic diagram overlapping unit 7, a display unit 8, an operation input unit 9, and a display control unit 10.

The logic diagram designating unit 1 accepts an operation of designating a logic diagram to be displayed from logic diagram viewer and designates a logic diagram in accordance with the operation. In this case, the logic diagram designating unit 1 accepts an operation of designating a plurality of logic diagrams and, on the basis of the operation, designates a set of the plurality of logic diagrams to be displayed. Hereinafter, the plurality of logic diagrams designated as logic diagrams to be displayed by the logic diagram designating unit 1 may be also referred to as "the plurality of designated logic diagrams". The logic diagram designating unit 1 outputs information indicative of the plurality of designated logic diagrams to the logic diagram analyzing unit 3.

The logic diagram analyzing unit 3 obtains the plurality of designated logic diagrams supplied from the logic diagram designating unit 1, from among the logic diagrams stored in the logic diagram storing unit 2, and analyzes the designated logic diagrams. The control logic comparing unit 4 compares control logics in the plurality of designated logic diagrams on the basis of the analysis result of the logic diagram analyzing unit 3 and extracts a different part (the difference in the control logics) as control logic comparison information.

The operation element location comparing unit 5 compares the locations of the operation elements disposed on the plurality of designated logic diagrams on the basis of a result of the comparison (control logic comparison information) of the control logic comparing unit 4 and extracts a different part (difference in the locations) as location comparison information. The logic diagram relocating unit 6 relocates the operation elements so that the operation elements as compared are overlapped while maintaining the control logics at an equal value in the case where the plurality of designated logic diagrams are overlapped, on the basis of the comparison result (the control logic comparison information) of the control logic comparing unit 4 and the comparison result (the location comparison information) of the operation element location comparing unit 5.

The logic diagram overlapping unit 7 overlaps the plurality of designated logic diagrams in which the operation elements are relocated by the logic diagram relocating unit 6. The display unit 8 displays the plurality of designated logic diagrams overlapped by the logic diagram overlapping unit 7 in a predetermined display method in which a common part of the operation elements (hereinbelow, "operation element common part") or the difference (hereinbelow, "operation element difference") can be discriminated. The operation input unit 9 receives an instruction on the predetermined display method of the display unit 8 and the like from the outside (for example, a logic diagram viewer). The display control unit 10 controls the logic diagram overlapping unit 7, thereby switching the predetermined display method to display in the display unit 8 in accordance with the instruction from the outside, received by the operation input unit 9.

Figure 2:
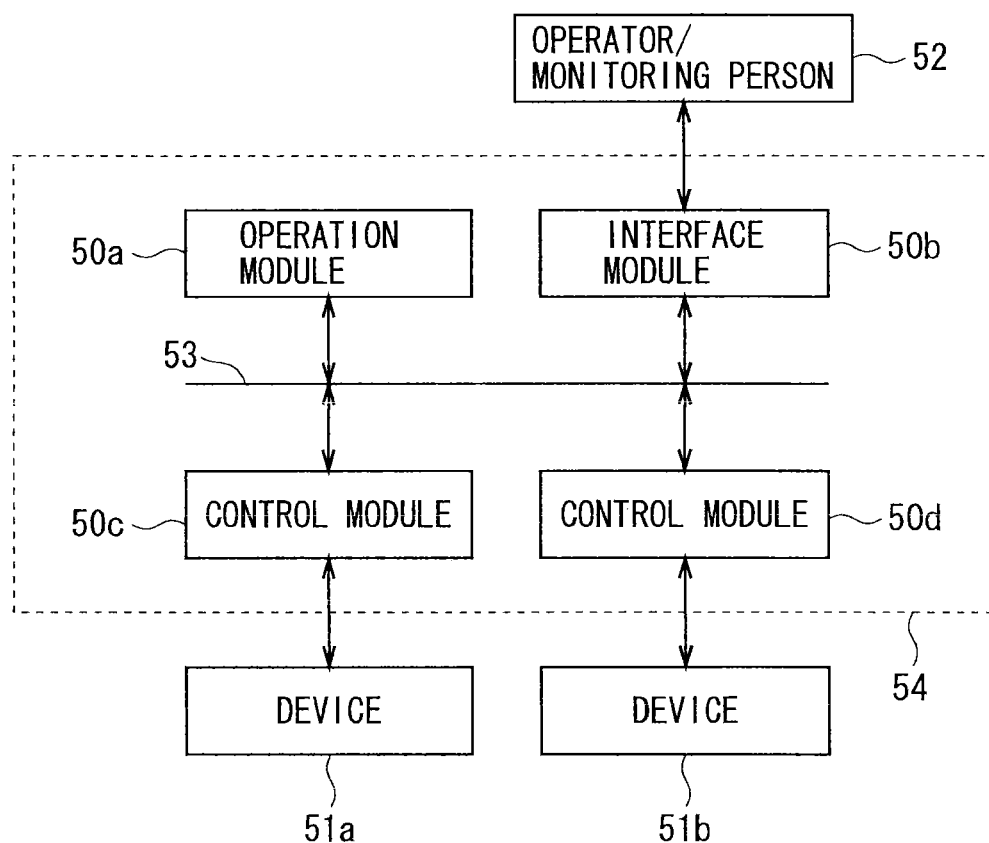
FIG. 2 is a block diagram illustrating the configuration of a monitor and control system.

FIG. 2 is a block diagram illustrating the configuration of a typical monitor and control system 54 which monitors and controls devices 51*a* and 51*b* in accordance with a logic diagram. The monitor and control system 54 has four modules 50 coupled by a communication path 53. The four modules 50 transmit/receive signals to/from one another via the communication path 53.

The four modules 50 are an operation module 50*a*, an interface module 50*b*, and control modules 50*c* and 50*d*. The control modules 50*c* and 50*d* control the devices 51*a* and 51*b* (hereinbelow, when the devices 51*a* and 51*b* are not discriminated, they may be referred to as "devices 51") to be monitored and controlled, respectively. The interface module 50*b* transmits/receives information to/from an operator/monitoring person 52. The operation module 50*a* performs calculation and the like on the basis of information from the other three modules 50*b*, 50*c*, and 50*d*.

FIG. 3 is a diagram illustrating an example of a logic diagram LG1 stored in the logic diagram storing device 2. The logic diagram LG1 illustrates a control logic of the control module 50*c* (FIG. 2) to monitor and control the device 51*a* on the basis of input signals from the interface module 50*b* and the control module 50*d*.

An operation element 60*a* expresses an input point in the control module 50*c*, at which a signal from the control module 50*d* controlling the other device 51*b* (FIG. 2), not the device 51*a*, is received. Each of the operation elements 60*b*, 60*c*, and 60*d* expresses an input point in the control module 50*c*, at which a signal from the interface module 50*b* (FIG. 2) is received. The interface module 50*b* corresponds to an operating device 60*q*, and an input signal which is supplied to the control module 50*c* from the interface module 50*b* changes according to an operation of the operator/monitoring person 52 in an operating device 60*q*.

The operating device 60*q* includes an open operation button 60*n* for outputting an input signal corresponding to an "open" operation to the operation element 60*b*, a close operation button 60*o* for outputting an input signal corresponding to a "close" operation to the operation element 60*c*, and a lock operation button 60*p* for outputting an input signal corresponding to a "lock" operation to the operation element 60*d*.

Each of operation elements 60*j*, 60*k*, 60*l*, and 60*m* expresses an output point in the control module 50*c*, at which signals are output to a device control circuit 60*u* for controlling the device 51*a* (FIG. 2) and a display circuit 60*v*. Although circuits for performing operations ("open", "close", "lock", and "display") on devices such as the device 51*a* are assigned to device control units 60*r*, 60*s*, and 60*t* in the device control circuit 60*u* actually, in the diagram, such detailed configurations of the circuits are not illustrated.

Hereinafter, to make understanding of the description easier, the operation elements 60*a* to 60*d* will be referred to as "input points 60*a* to 60*d*", and the operation elements 60*j* to 60*m* will be referred to as "output points 60*j* to 60*m*". As illustrated in FIG. 3, on the right side of the input points 60*a* to 60*d* and the output points 60*j* to 60*m*, names of corresponding signals as attribute information are written as "51A01", "51A02", and the like.

Each of operation elements 60*e*, 60*f*, and 60*g* is an element which outputs "1" only in the case where all of input signals are "1" and outputs "0" in the other cases, that is, an element which performs AND operation on a signal. Each of operation elements 60*h* and 60*w* is an element which outputs "1" in the case where an input signal is "0" and outputs "0" when the input signal is "1", that is, an element which performs NOT operation on a signal. An operation element 60*i* is an element which inverts the state of an output signal from "0" to "1" and outputs "1" or inverts the state of an output signal from "1" to "0" and outputs "0" each time an input signal changes from "0" to "1", that is, an element having the function of a 1-input flip flop. In the following description, in some cases, the operation elements 60*e* to 60*g* will be referred to as "AND elements 60*e* to 60*g*", the operation elements 60*h* and 60*w* will be called "NOT elements 60*h* and 60*w*", and the operation element 60*i* will be called "1-input flip flop element 60*i*".

A signal from the input point 60*d* passes through the 1-input flip flop element 60*i* and branched to two signals. One of the branched signals is output to the output point 60*m*, and the other signal passes through the NOT element 60*h* and is further branched to two signals which are supplied to the two AND elements 60*e* and 60*g*. A signal from the input point 60*c* is output to the AND element 60*g*. The AND element 60*g* outputs a signal obtained by performing AND of the signal from the input point 60*c* and the signal from the NOT element 60*h* to the output point 60*l*. A signal from the input point 60*b* is output to the AND element 60*e*. The AND element 60*e* outputs a signal obtained by performing AND on the signal from the input point 60*b* and the signal from the NOT element 60*h* to the AND element 60*f*. A signal from the input point 60*a* passes through the NOT element 60*w* and, after that, is output to the AND element 60*f*. The AND element 60*f* outputs a signal obtained by performing AND of the signal from the NOT element 60*w* and the signal from the AND element 60*e*. A signal from the AND element 60*f* is branched to two signals which are output to the two output points 60*j* and 60*k*. In the example illustrated in FIG. 3, the plurality of operation elements 60*a* to 60*m* are connected via signal lines so that the signals described as above are input/output.

FIG. 4 is a diagram illustrating an example of a logic diagram LG2 similar to the logic diagram LG1, stored in the logic diagram storing device 2. The logic diagram LG2 expresses a control logic of the control module 50*d* (FIG. 2) which monitors and controls the device 51*b* on the basis of the input signals from the interface module 50*b* and the control module 50*d*.

As understood from comparison between the logic diagram LG1 illustrated in FIG. 3 and the logic diagram LG2 illustrated in FIG. 4, operation elements 70*a* to 70*m* in the logic diagram LG2 correspond to the operation elements 60*a* to 60*m* in the logic diagram LG1, respectively, and an operating device 70*q*, a device control circuit 70*u*, and a display circuit 70*v* correspond to the operating device 60*q*, the device control circuit 60*u*, and the display circuit 60*v*, respectively. On the other hand, there are large and small difference points between the logic diagrams LG1 and LG2.

The large difference points are a point that the operation element corresponding to an input point 70*y* in the logic diagram LG2 does not exist in the logic diagram LG1 and a point that an operation element 70*x* having a function different from that of the NOT element 60*w* exists in a position almost the same as that of the NOT element 60*w* in the logic diagram LG1. The operation element 70*x* is an element which outputs "0" only in the case where all of input signals are "0" and outputs "1" in the other cases, that is, an element which performs OR operation on a signal. In the following description, the operation element 70x will be also referred to as "OR element 70x".

In the logic diagram LG1 (FIG. 3), the signal from the input point 60a is output to the AND element 60f via the NOT element 60w, on the other hand, in the logic diagram LG2 (FIG. 4), signals from the input points 70a and 70y are output to the OR element 70x, and a signal which is obtained by performing OR on the signals from the input points 70a and 70y in the OR element 70x, is output to the AND element 70f.

The small difference points include a point that the locations of the corresponding NOT elements 60h and 70h are deviated. The detail will be described later.

Figure 5:
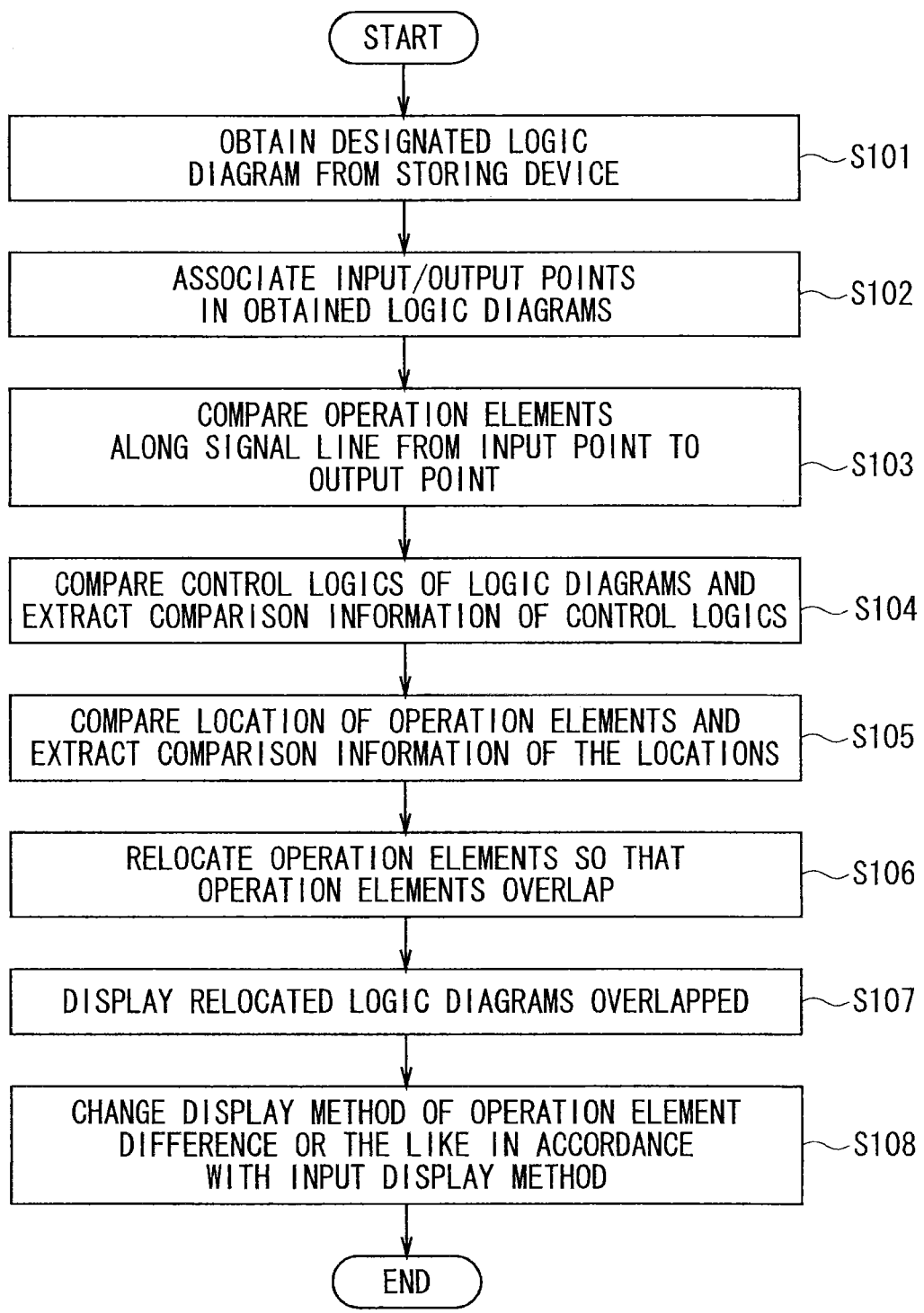
FIG. 5 is a flowchart illustrating the operation of the logic diagram display device according to the first embodiment.

FIG. 5 is a flowchart illustrating the operation of the logic diagram display device in the preferred embodiment, which displays a plurality of designated logic diagrams in an overlapped manner. Hereinafter, the operation of the logic diagram display device which displays the logic diagrams LG1 and LG2 in an overlapped manner in the case where a logic diagram viewer gives an instruction to display the logic diagrams LG1 and LG2 will be described in detail with reference to FIGS. 3 to 9.

In step S101, the logic diagram analyzing unit 3 obtains the logic diagrams LG1 and LG2 (the plurality of designated logic diagrams) designated by the logic diagram designating unit 1 from the logic diagram storing device 2.

In step S102, the logic diagram analyzing unit 3 analyzes the two logic diagrams LG1 and LG2 and associates the input/output points (the operation elements at the input and output points) in the logic diagrams LG1 and LG2.

As for association on the input point side, the logic diagram analyzing unit 3 associates the input point 60b ("51A02"), the input point 60c ("51A03"), and the input point 60d ("51A04") in the logic diagram LG1 with the input point 70b ("51B02"), the input point 70c ("51B03"), and the input point 70d ("51B04") in the logic diagram LG2, respectively on the basis of the connection relation between the operating devices 60q and 70q and the input points 60b to 60d and the input points 70b to 70d. Further, the logic diagram analyzing unit 3 associates the remaining input point 60a ("51A01") in the logic diagram LG1 with the remaining input point 70a ("51B01") in the logic diagram LG2 in consideration of coordinate positions (location positions) in the logic diagrams LG1 and LG2.

As for association on the output point side, the logic diagram analyzing unit 3 associates the output point 60j ("51A10"), the output point 60k ("51A11"), the output point 60l ("51A12"), and the output point 60m ("51A13") in the logic diagram LG1 with the output point 70j ("51B10"), the output point 70k ("51B11"), the output point 70l ("51B12"), and the output point 70m ("51B13") in the logic diagram LG2, respectively on the basis of the connection relation between the device control circuits 60u and 70u and the display circuits 60v and 70v and the output points 60j to 60m and the output points 70j to 70m.

In step S103, the control logic comparing unit 4 compares the operation elements along the signal lines from the input points 60a to 60d toward the output points 60j to 60m with the signal lines from the input points 70a to 70d toward the output points 70j to 70m in the associated input/output points. In step S104, the control logic comparing unit 4 extracts (detects) comparison information of the two logic diagrams LG1 and LG2 from a comparison result of the operation elements in step S103.

In the step S104, the control logic comparing unit 4 compares the logic diagrams LG1 and LG2 along the signal lines and extracts operation elements of different functions as control logic comparison information. For example, the control logic comparing unit 4 compares the logic diagrams LG1 and LG2 along the signal lines from the input points 60a and 70a and LG2 to extract, as the control logic comparison information, information that the NOT element 60w exists in the logic diagram LG1 and the OR element 70x whose function is different from that of the NOT element 60w exists in the logic diagram LG2.

In the step S104, the control logic comparing unit 4 extracts, as the control logic comparison information, an operation element other than the operation elements associated in the steps S102 and S103. For example, the control logic comparing unit 4 performs the extracting operation on the two logic diagrams LG1 and LG2, thereby extracting the input point 70y ("51B00") which does not exist in the logic diagram LG1 (FIG. 3) but exists in the logic diagram LG2 (FIG. 4) as the control logic comparison information.

In the step S104, the control logic comparing unit 4 extracts the signal names of the operation elements at the input/output points associated in step S102 as comparison information. For example, the control logic comparing unit 4 performs the extracting operation on the logic diagrams LG1 (FIG. 3) and LG2 (FIG. 4), thereby extracting, as comparison information, the signal names "51A01", "51A02", "51A03", "51A04", "51A10", "51A11", "51A12", and "51A13" in the logic diagram LG1 and the signal names "51B00", "51B01", "51B02", "51B03", "51B04", "51B10", "51B11", "51B12", and "51B13" in the logic diagram LG2.

In step S105, the operation element location comparing unit 5 compares the locations (coordinate positions) of the operation elements in the two logic diagrams LG1 and LG2 on the basis of the control logic comparison information extracted in step S104 and extracts (detects) the difference of the locations obtained by the comparison as location comparison information. In this case, the operation element location comparing unit 5 compares the locations of the operation elements compared in the step S104 to extract the location comparison information.

Figure 6:
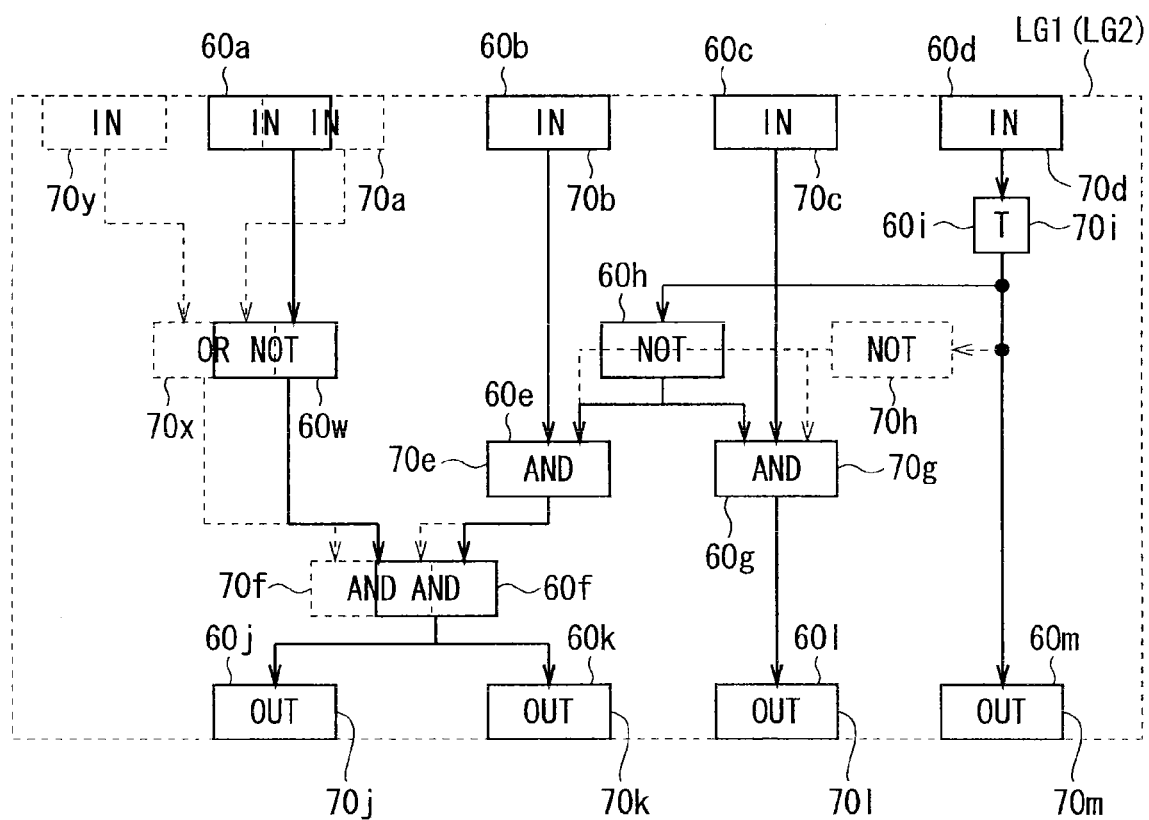
FIG. 6 is a diagram in which the logic diagrams LG1 and LG2 are overlapped.

FIG. 6 is a diagram in which the logic diagram LG2 (dotted line) is simply overlapped on the logic diagram LG1 (solid line) without any change. The overlapping in the preferred embodiment denotes overlapping of the logic diagrams LG1 and LG2 without painting out the blank part. In the example, the operation element location comparing unit 5 extracts, as the location comparison information, the difference between the locations of the input points 60a and 70a, the difference between the locations of the AND elements 60f and 70f, and the difference between the locations of the NOT elements 60h and 70h, compared in the extraction of the control logic comparison information.

In step S106, the logic diagram relocating unit 6 relocates the operation elements while maintaining the control logics equivalently so that the outer shapes of the operation elements as compared above overlap in the case where the plurality of logic diagrams LG1 and LG2 are overlapped on the basis of the control logic comparison information and the location comparison information extracted in the steps S104 and S105.

Figure 7A:
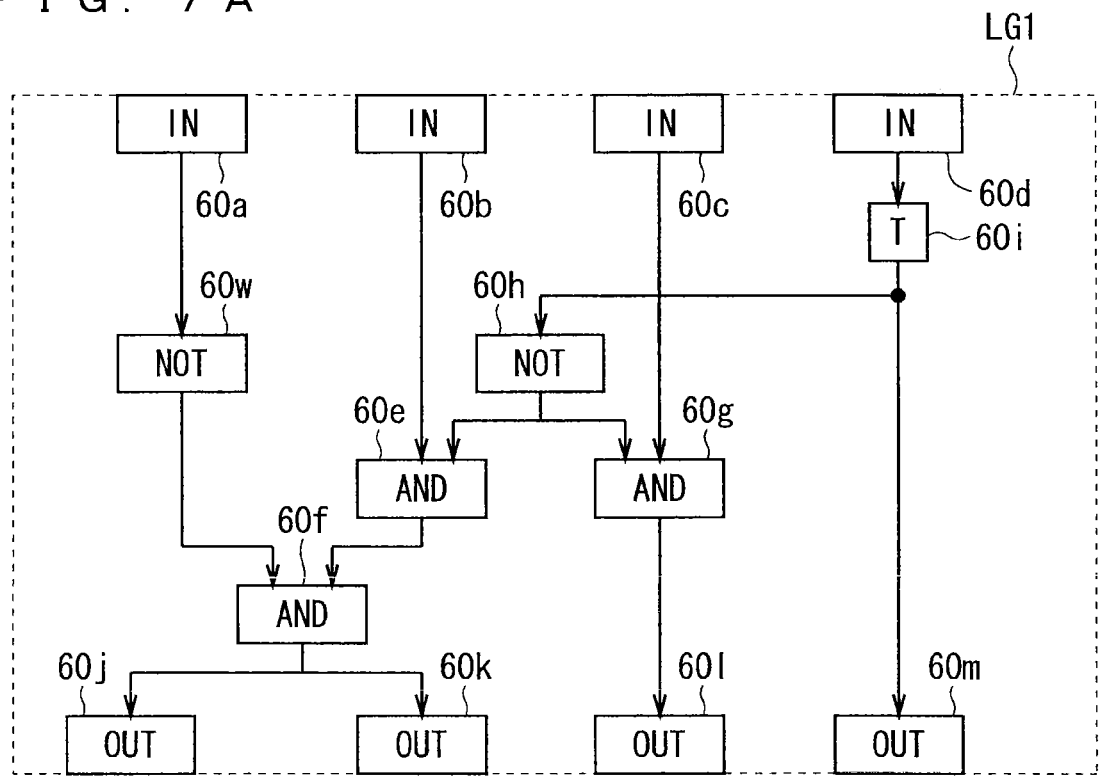
FIGS. 7A and 7B are diagrams illustrating the logic diagrams LG1 before and after relocation.
Figure 7B:
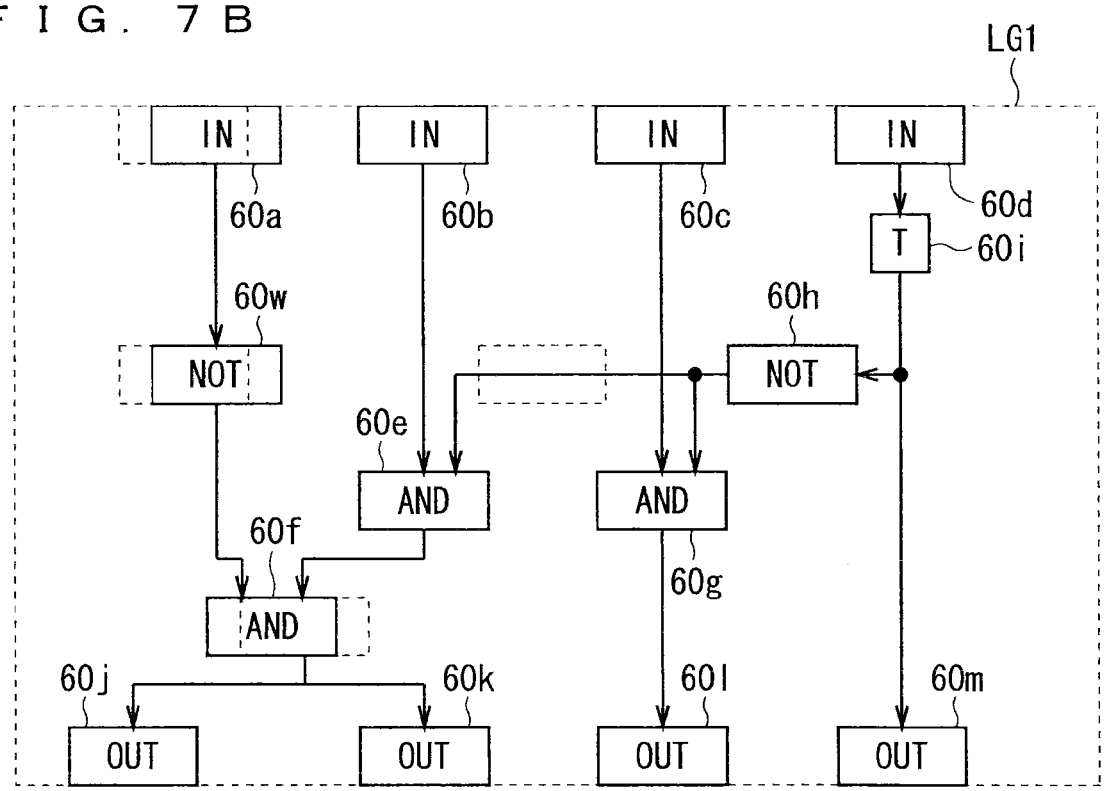

FIG. 7A is a diagram illustrating the logic diagram LG1 before the location change (which is the same as the logic diagram LG1 illustrated in FIG. 3), and FIG. 7B is a diagram illustrating the logic diagram LG1 after the location change. Frames indicated by dotted lines express the positions of the operation elements before the location change. In this case, the operation elements (the input point 60a, the AND element 60f, and the NOT element 60h) in the logic diagram LG1, whose locations are different from those of the operation elements in the logic diagram LG2 are moved to locations similar to the locations of the operation elements (the input point 70a, the AND element 70f, and the NOT element 70h) in the logic diagram LG2. In accordance with the moved input point 60a, a signal line connected to the input point 60a and the NOT element 60w connected to the signal line are moved.

In step S107, the logic diagram overlapping unit 7 overlaps the logic diagrams LG1 and LG2 in which the operation elements are relocated in step S106. The signal names of the operation elements extracted as the comparison information are disposed in two rows so as not to be overlapped. The display unit 8 displays the logic diagrams LG1 and LG2 overlapped by the logic diagram overlapping unit 7 so that the operation element common parts or the operation element differences can be discriminated.

Figure 8:
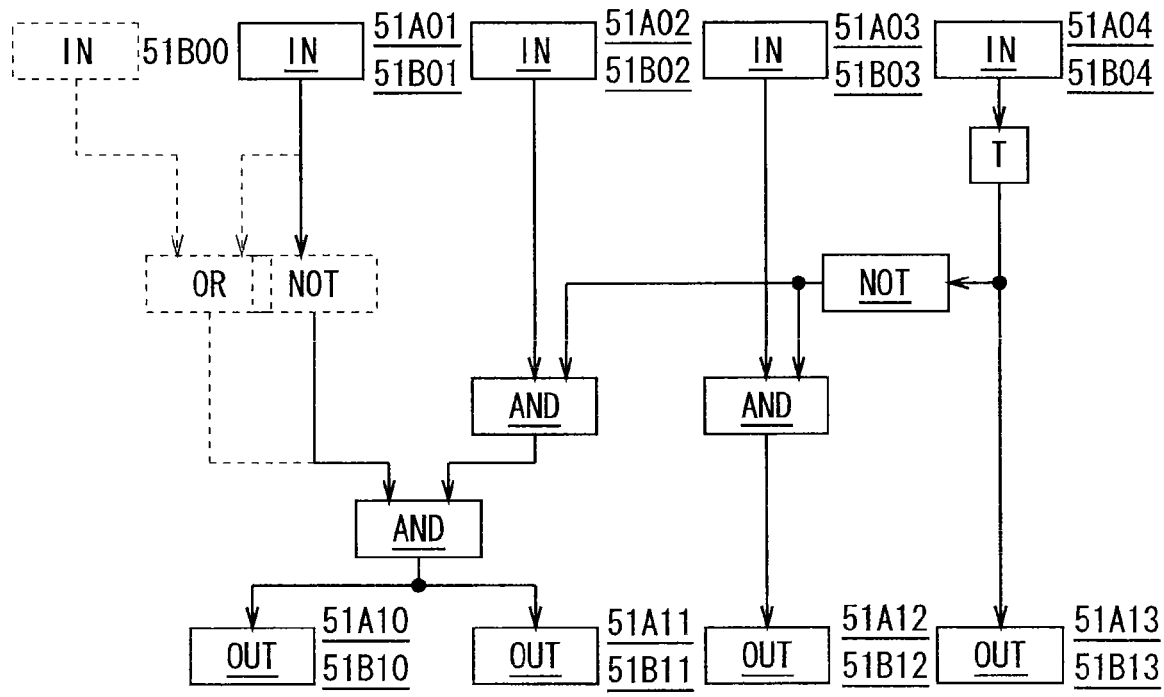
FIG. 8 is a diagram illustrating an example of overlapped display according to the first embodiment.
Figure 9A:
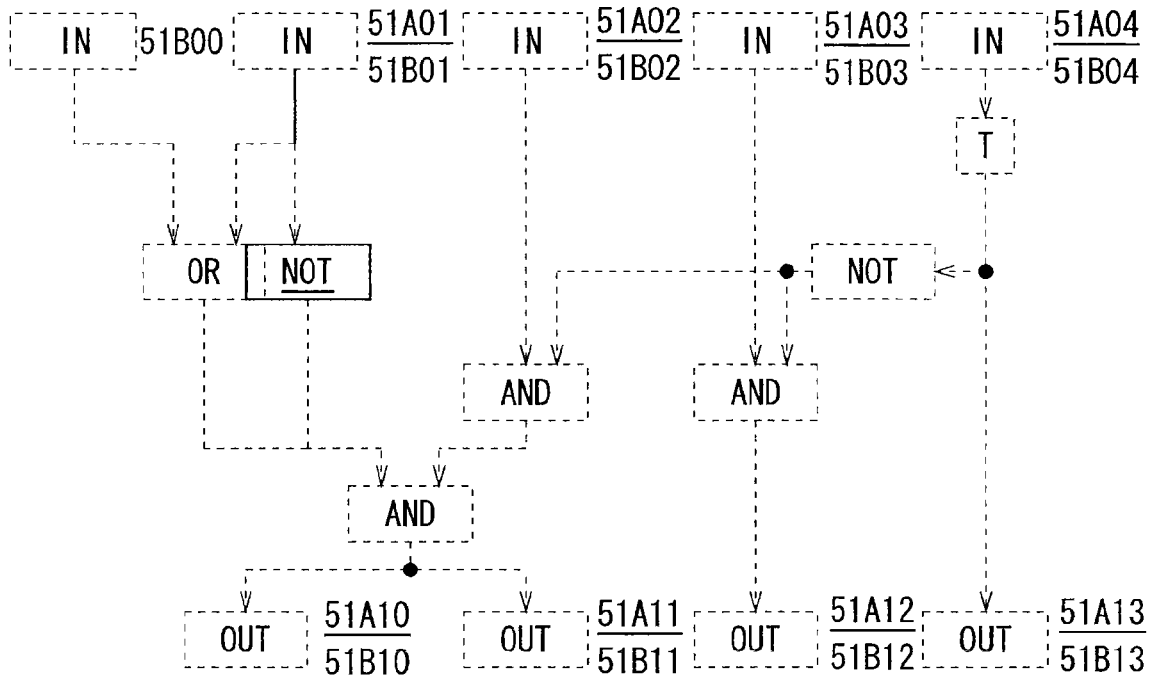
FIGS. 9A and 9B are diagrams illustrating an example of overlapped display according to the first embodiment.
Figure 9B:
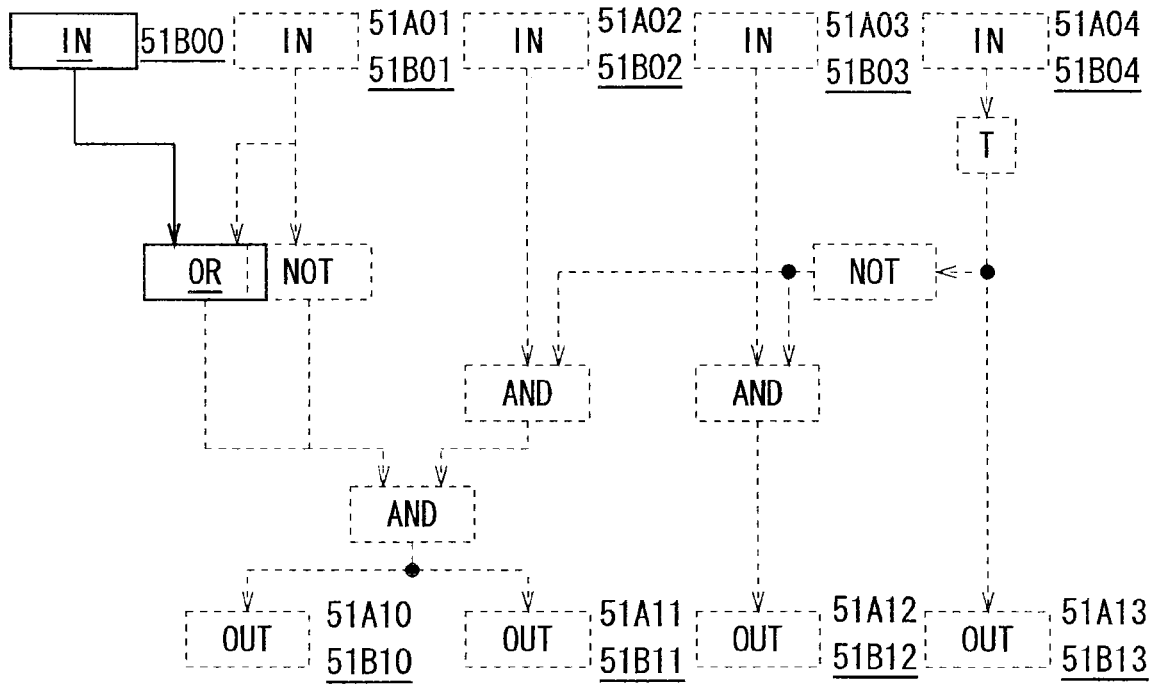

FIG. 8 and FIGS. 9A and 9B are diagrams illustrating an example of overlapped display of the logic diagrams LG1 and LG2 in the display unit 8. In the preferred embodiment, as predetermined display methods of displaying the operation element common part or the operation element difference distinguishable on the display unit 8, three kinds of predetermined display methods are prepared, which are "common part display" illustrated in FIG. 8, "display of the difference in LG1" illustrated in FIG. 9A, and "display of the difference in LG2" illustrated in FIG. 9B.

In step S108, the display control unit 10 switches the predetermined display method to display in the display unit 8 in accordance with a designation received by the operation input unit 9. In such a manner, in the logic diagram display device and the logic diagram display method according to the preferred embodiment, a control of changing the predetermined display method of display in the display unit 8 is performed in accordance with the operation input in the operation input unit 9.

When the "common part display" is designated in the operation input unit 9, the display is switched to the display illustrated in FIG. 8. When the "display of the difference of LG1" is designated, the display is switched to the display illustrated in FIG. 9A. When the "display of the difference of LG2" is designated, the display is switched to the display illustrated in FIG. 9B. Next, each of the predetermined display methods will be described in detail.

In the "common part display" illustrated in FIG. 8, the outer shape of the operation elements of the logics which are common to the logic diagrams LG1 and LG2 (that is, the operation element common part which is the common logic) is highlighted by a solid line. On the other hand, the outer shape of an operation element corresponding to the difference between the logic diagrams LG1 and LG2 (an operation element existing only in one of the logic diagrams) is displayed by a dotted line.

In the "display of the difference of LG1" illustrated in FIG. 9A, the outer shape of an operation element corresponding to the difference from the common logic of the logic diagram LG2 is highlighted by a solid line. On the other hand, the outer shape of an operation element corresponding to the part common to the common logic of the logic diagram LG2 is displayed by a dotted line. The names of the input/output points and attribute information (for example, AND) indicative of the attribute (function) of an operation element in the logic diagram LG1 are underlined so as to be highlighted. Accordingly, it becomes clear that the difference display performed in the display unit 8 is display of the difference of LG1.

In the "display of the difference of LG2" illustrated in FIG. 9B, the outer shape of an operation element corresponding to the difference from the common logic of the logic diagram LG1 is highlighted by a solid line. On the other hand, the outer shape of an operation element corresponding to the part common to the common logic of the logic diagram LG1 is displayed by a dotted line. The names of the input/output points and attribute information indicative of the attribute (function) of an operation element in the logic diagram LG2 are underlined so as to be highlighted. Accordingly, it becomes clear that the difference display performed in the display unit 8 is display of the difference of LG2.

In the logic diagram display device and method according to the preferred embodiment as described above, the plurality of logic diagrams in which the operation elements are relocated while maintaining the control logics equivalently and which are overlapped are displayed in a predetermined display method by which the common part or the difference of the operation elements can be discriminated. And the predetermined display method is switched in accordance with an instruction from the outside. Accordingly the plurality of diagrams can be efficiently compared and collated. Therefore, the time for comparison and collation can be reduced, and occurrence of a human error in the comparing work can be prevented, so that the quality of monitor and control process can be improved.

In the above description, the control logic comparing unit 4 extracts the comparison information along the signal line from the input point toward the output point. However, the present invention is not limited to the case. The control logic comparing unit 4 may extract comparison information along the signal line from the output point toward the input point.

The input/output points are associated in consideration of the connection relations of the operating devices and the like and, in addition, the coordinate positions. By taking not only the coordinate position but also the number of a signal, the name of a signal, and the like into account, more versatile association of the input/output points can be performed. Regarding to the association, the present invention is not limited to use the information in logic diagrams. For example, the association may be performed using information other than logic diagrams, such as a list of the names of input/output points.

Although the overlapping display including the relocation in very simple logic diagrams as illustrated in FIGS. 3 and 4 has been described above, the present invention is not limited to such a simple case. For example, when the operations in the module 50 become large-scale, it becomes difficult to write the behavior in a single logic diagram and, in many cases, the behavior is expressed in a plurality of diagrams. In such a case, it is sufficient to store connection relations by expressing signals from one diagram to another diagram by symbols in each of the diagrams and compare the plurality of logic diagrams.

Although the overlapping display of two logic diagrams has been described as an example in the above, it is similar also in the case where there are three or more logic diagrams. Although the signal names are displayed in two rows, when an operation element other than the input/output points has names, the names of the operation element are also displayed in two rows. The case is not limited to display the names of an operation element in rows. For example, in the case where there is attribute information to be displayed of an operation element, it is sufficient to display the attribute information in rows so as not to be overlapped.

Second Embodiment

FIG. 10 is a block diagram illustrating the configuration of a logic diagram editing device (logic diagram processing device) according to a second embodiment of the present invention. In the logic diagram editing device according to the preferred embodiment, the same reference numerals are designated to components which are the same as or similar to those described in the first embodiment, and points different from the first embodiment will be mainly described.

In the first embodiment, the logic diagrams are displayed in the display unit 8. The logic diagram editing device according to the second embodiment can edit a logic diagram displayed in the display unit 8 in accordance with an instruction from the outside.

In the first embodiment, a logic diagram viewer himself/herself designates a plurality of logic diagrams to be displayed in the logic diagram designating unit 1 and they are overlapped and displayed. However, the number of logic diagrams is enormous in reality and, in some cases, the work itself of designating diagrams to be compared and collated from a number of diagrams is troublesome and it takes time.

In the preferred embodiment, logic diagrams can be edited and, in addition, a logic diagram viewer himself/herself designates, for example, one logic diagram he/she wants to edit, thereby enabling logic diagrams similar to the designated logic diagram to be automatically specified, overlapped, and displayed. Hereinafter, the logic diagram editing device according to the preferred embodiment will be described in detail.

As illustrated in FIG. 10, the logic diagram editing device of the preferred embodiment has, in addition to the components of the logic diagram display device of the first embodiment, an upstream written material storing device 11 storing upstream written material which is information on a plurality of devices, an upstream written material analyzing unit 12, a similar device searching unit 13, a logic diagram editing unit 14, and a logic diagram storing unit 15.

The logic diagram designating unit 1 receives an operation of designating a logic diagram desired to be edited (displayed) from a logic diagram editor and designates a logic diagram in accordance with the operation. The logic diagram designating unit 1 outputs information indicative of the designated logic diagram to the upstream written material analyzing unit 12.

The upstream written material analyzing unit 12 obtains upstream written material on a device to be controlled (hereinbelow, also referred to as "target device") by the logic diagram designated by the logic diagram designating unit 1 from among the upstream written material stored in the upstream written material storing device 11, and analyzes the obtained upstream written material. The upstream written material is information generated at a designing stage of the monitor and control system. In the preferred embodiment, the upstream written material includes information illustrated in FIGS. 11 and 12 which will be described later. The similar device searching unit 13 specifies (searches) a similar device similar to the target device on the basis of the analysis result of the upstream written material analyzing unit 12 and outputs logic diagrams of the target device and the similar device to the logic diagram analyzing unit 3.

In the preferred embodiment, the logic diagram editing device uses the logic diagram of the similar device as the designated logic diagram described in the first embodiment.

Further, in the preferred embodiment, the operation input unit 9 receives editing information of the logic diagram supplied from the logic diagram editor. The logic diagram editing unit 14 edits at least one of the plurality of logic diagrams displayed in the display unit 8 on the basis of the editing information supplied to the operation input unit 9. The logic diagram storing unit 15 stores a logic diagram edited by the logic diagram editing unit 14 into the logic diagram storing device 2. In the logic diagram storing device 2, the logic diagram edited by the logic diagram editing unit 14 is stored.

Figure 11:
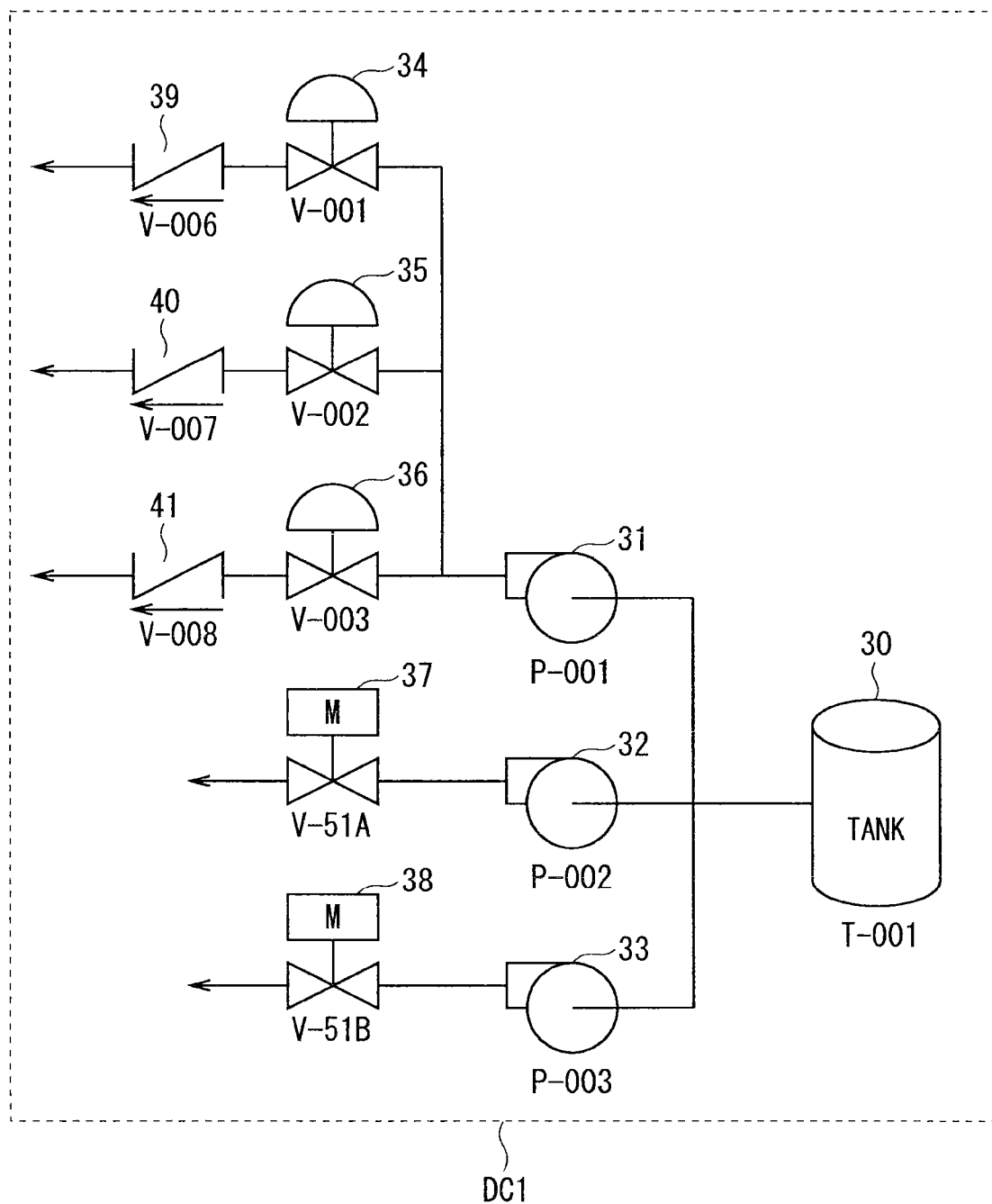
FIG. 11 is a diagram illustrating a system diagram.

FIG. 11 is a diagram illustrating a system diagram DC1 stored in the upstream written material storing device 11 as upstream written material. That is upstream written material in the preferred embodiment includes the system diagram DC1 illustrating mutual connection relations of the devices 51 (FIG. 2) to be monitored and controlled by the monitor and control system 54.

In the example illustrated in FIG. 11, the monitor and control system 54 includes a tank 30, three electric pumps 31, 32, and 33, three air operation valves 34, 35, and 36, two electric-operated valves 37 and 38, three check valves 39, 40, and 41, and pipes connecting those devices as the devices 51. Concretely, the tank 30 is connected to the electric-operated valves 37 and 38 via the electric pumps 32 and 33 and is also connected to the electric pump 31. The electric pump 31 is connected to the check valves 39, 40, and 41 via the air operation valves 34, 35, and 36, respectively. To the devices 51, device names peculiar to the devices 51, such as "T-001" and "P-001" are assigned.

FIG. 12 is a diagram illustrating a device specification list DC2 stored in the upstream written material storing device 11 as upstream written material. That is, the upstream written material in the preferred embodiment includes not only the system diagram DC1 but also a device specification list DC2 in which the specifications of the plurality of devices 51 described in the system diagram DC1 are described.

In the example illustrated in FIG. 12, as the specifications of the plurality of devices 51, "device name", "device type" indicative of the type of the device 51, "control type" indicative of the method of controlling (operating) in the device 51, "maker" indicative of a manufacturer or the like of the device 51, and "model" of the device 51 are described in the device specification list DC2. As "control type", for example, there are a case of controlling an electric pump only by "on" and "off" buttons, a case of providing the "on" and "off" buttons and, in addition, a "lock" button and controlling an electric pump, and the like and, for example, the cases are called "type A", "type B", and the like. "-" in "control type" in the device specification list DC2 denotes no control.

Generally, the characteristics of the devices on which a control process is performed in the monitor and control system 54 are often similar to one another, and monitor and control processes are also often similar to one another. In the case where the monitor and control processes are similar to one another, the logic diagrams are also similar to one another.

In the logic diagram editing device and method of the preferred embodiment, by analyzing upstream written material, performing matching on the device characteristics, and specifying a similar device similar to a target device from among a plurality of devices, automatic search of a logic diagram similar to the logic diagram of the target device can be performed.

Therefore, since a work of searching a logic diagram similar to a desired logic diagram becomes unnecessary, the work burden on a designer and the like can be lessened. Next, the operations of the logic diagram editing device and method in the preferred embodiment will be described.

Hereinafter, the operations of the logic diagram editing device according to the preferred embodiment when the logic diagram of the device 51 "V-51B" (the electric-operated valve 38) illustrated in FIG. 11 is designated by the logic diagram designating unit 1 will be described in detail with reference to the drawings.

Figure 13:
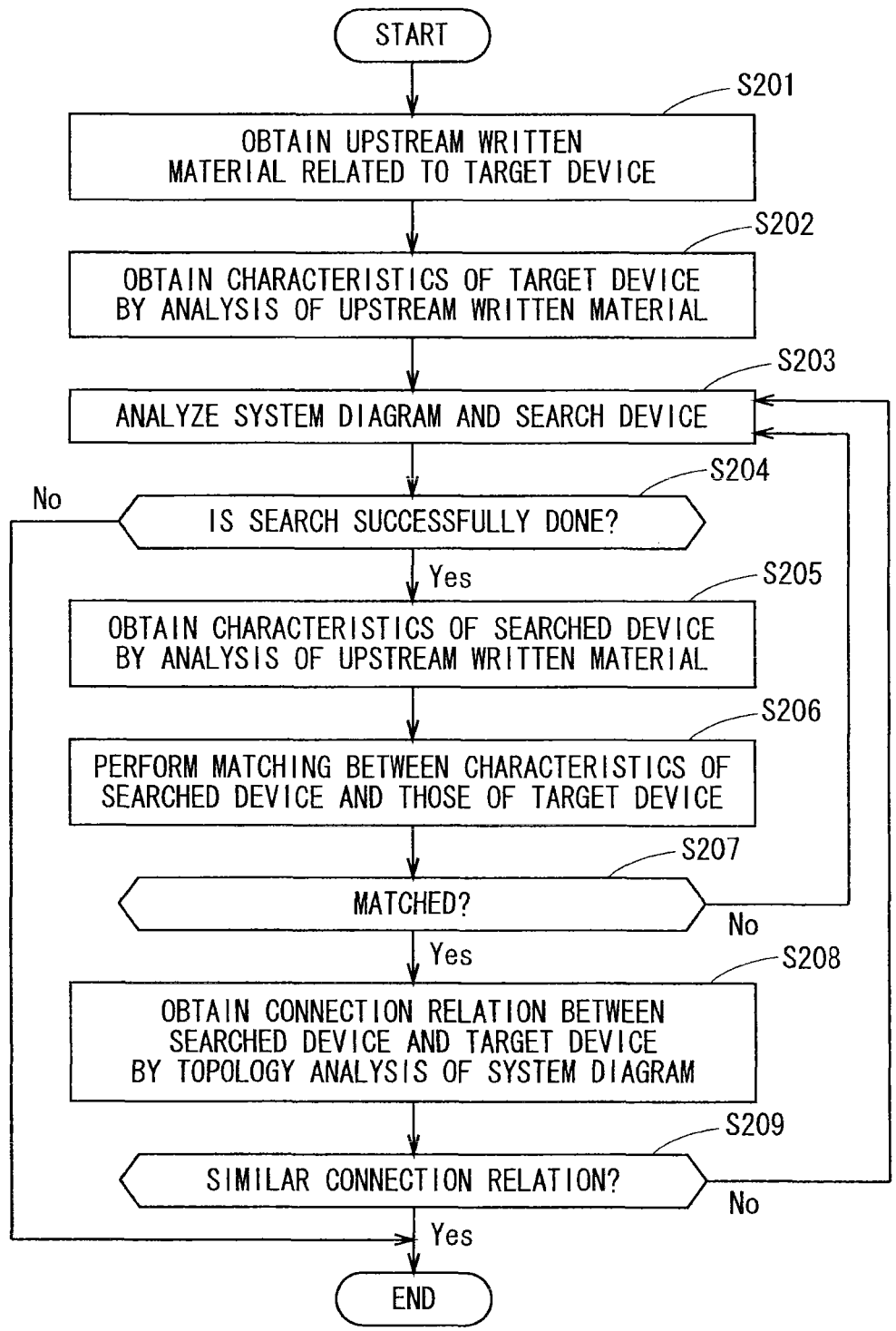
FIG. 13 is a flowchart illustrating the operation of the logic diagram editing device according to the second embodiment.

FIG. 13 is a flowchart illustrating the operation of specifying a similar device similar to a target device of a logic diagram designated by the logic diagram designating unit 1, by the similar device searching unit 13 (FIG. 10). First, with reference to FIG. 13 and the like, an operation of specifying a similar device similar to the target device "V-51B", of the similar device searching unit 13 will be described with reference to FIG. 13 and the like.

In step S201, the upstream written material analyzing unit 12 obtains upstream written material related to the target device "V-51B" in the logic diagram designated by the logic diagram designating unit 1 from the upstream written material storing device 11. Concretely, the upstream written material analyzing unit 12 obtains, as the upstream written material, the system diagram DCI illustrated in FIG. 11 and the device specification list DC2 illustrated in FIG. 12.

In step S202, the upstream written material analyzing unit 12 analyzes the device specification list DC2 (the device type and the control type) to obtain (the device type and the control type) of the target device "V-51B". In the example illustrated in FIG. 12, as the device type and the control type of the target device "V-51B", "electric-operated valve A" and "type C" are obtained.

In step S203, the upstream written material analyzing unit 12 analyzes the system diagram DC1 and detects whether there is the device 51 to be compared (hereinbelow, referred to as "comparison device") with the target device "V-51B" or not. As understood from the flowchart of FIG. 13, there is a case that the step S203 is performed after steps S207 and S209 which will be described later. In this case, the step S203 is performed a plurality of times. The comparison device to be searched in step S203 is changed each time the step S203 is performed. In the preferred embodiment, the comparison device to be searched in the step S203 is changed one by one in order of "T-001", "P-001", "P-002", "P-003", "V-001", "V-002", "V-003", "V-51A", "V-006", "V-007", and "V-008".

In step S204, the upstream written material analyzing unit 12 determines whether search of the comparison device in step S203 is successfully done or not. In the case of YES, the program proceeds to step S205. In the case of NO (in the preferred embodiment, when the search has been already performed once on "T-001" to "V-008"), the operation is finished.

In step S205, like in step S202, the upstream written material analyzing unit 12 analyzes the device specification list DC2 (the device type and the control type) to obtain the device characteristics (the device type and the control type) of the comparison device. For example, in the case where the step S205 is performed first in the preferred embodiment, the device type and the control type of "T-001" (that is, "tank" and "-") are obtained.

In step S206, the similar device searching unit 13 compares the device type and the control type of the comparison device with those of the target device "V-51B", thereby performing a matching of determining whether they match or not. When the similar device searching unit 13 determines a match in the matching in step S207, the program proceeds to step S208. When a mismatch is determined, the program returns to step S203.

For example, in the case where the steps S206 and S207 are performed for the first time in the preferred embodiment, the similar device searching unit 13 performs a matching between the device type and the control type of the comparison device "T-001" and those of the target device "V-51B". Since the device type and the control type of the comparison device "T-001" are "tank" and "-" and the device type and the control type of the target device "V-51B" are "electric-operated valve A" and "type C", a mismatch is determined. As a result, the program returns to step S203. After that the steps S203 to S207 are performed a plurality of times and, when the device "V-51A" (the device type is "electric-operated valve" and the control type is "type C") becomes the comparison device, the program proceeds to step S208.

In step S208, the upstream written material analyzing unit 12 analyzes the topology of the comparison device determined as a match in the step S207 and that of the target device to obtain the device characteristics (connection relations) of the devices.

In step S209, the similar device searching unit 13 determines whether or not the connection relation of the comparison device and that of the target device "V-51B" are similar to each other. In the case where it is determined in the step S209 that the connection relation of the comparison device and that of the target device are similar to each other, the comparison device is determined as a similar device and the operations illustrated in FIG. 13 are finished. In the case of "No", the program returns to the step S203. In such a manner, the above operations are repeated until it is determined in S209 that the connection relations are similar to each other.

A concrete example will be described. In the case where the comparison device is "V-51A", the topology of V-51A is similar to that of the target device "V-51B", so that the similar device searching unit 13 determines that both the comparison device and the target device have a similar connection relation. Therefore, by the operations illustrated in FIG. 13, the device "V-51A" is specified as a similar device of the target device "V-51B" in the similar device searching unit 13.

Like in the above operations, when "V-51A" is detected as a similar device similar to the target device "V-51B", the logic diagram of the target device "V-51B" and the logic diagram of the similar device "V-51A" are output to the logic diagram analyzing unit 3.

Figure 14:
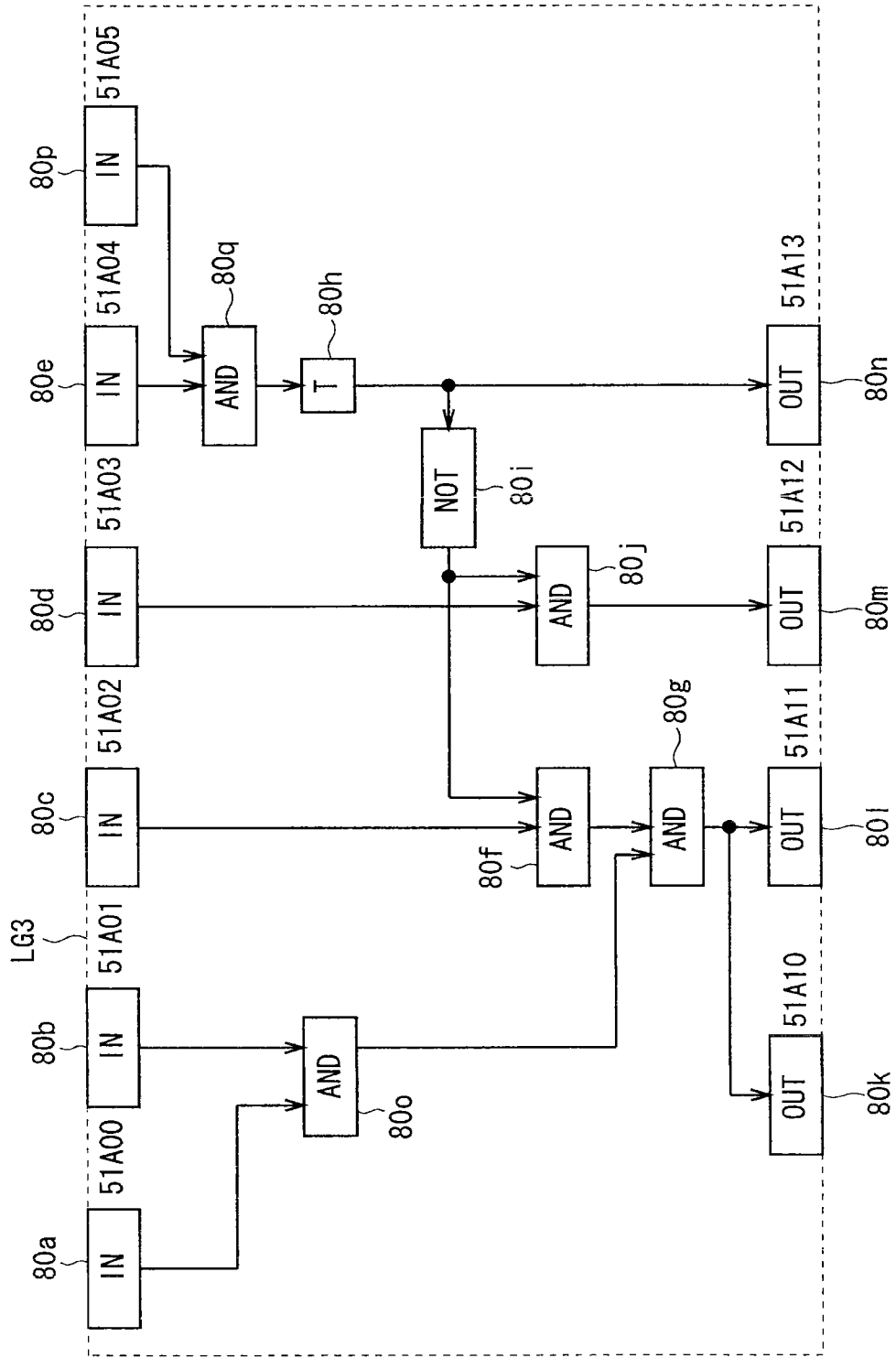
FIG. 14 is a diagram illustrating an example of a logic diagram LG3.
Figure 15:
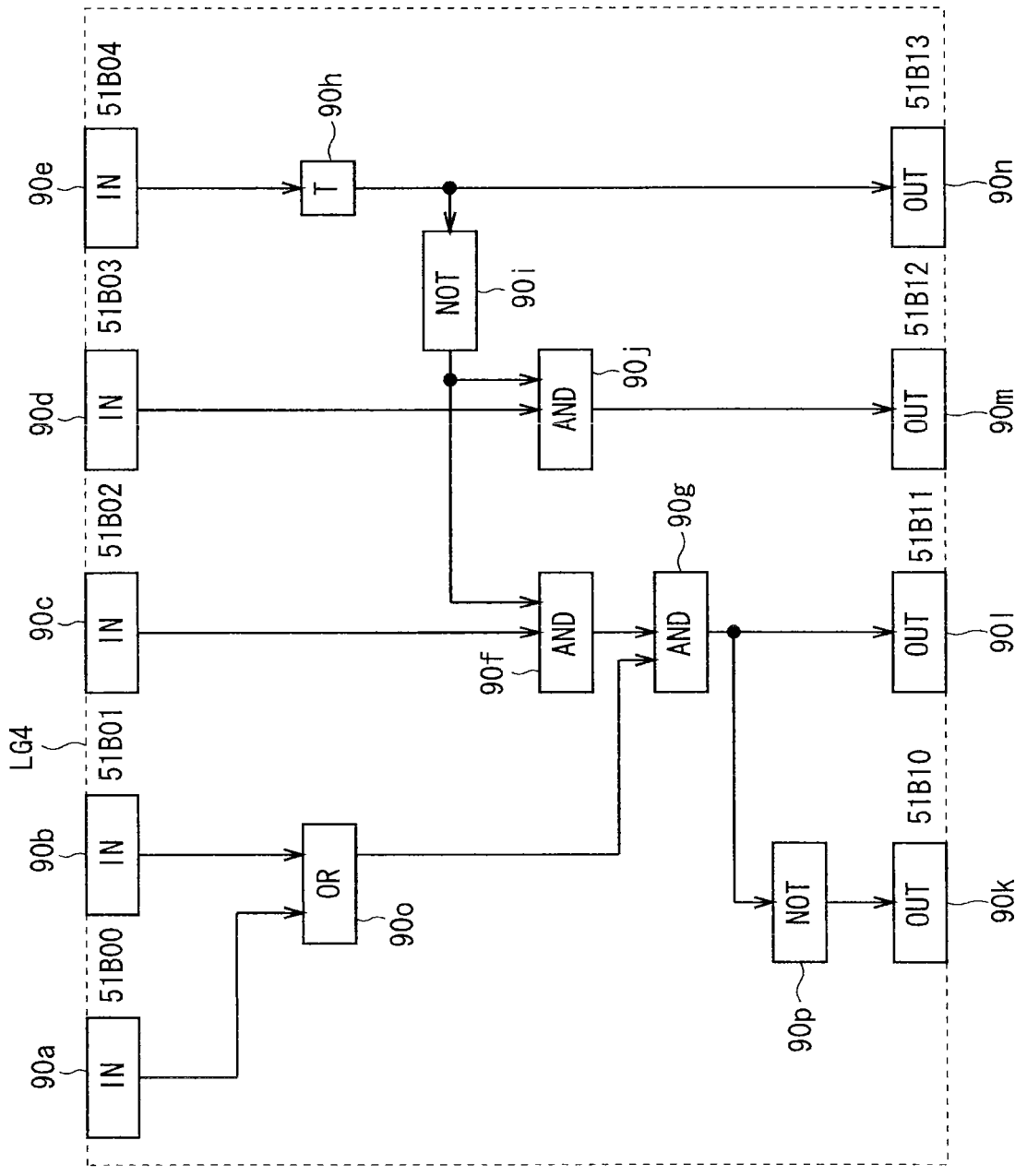
FIG. 15 is a diagram illustrating an example of a logic diagram LG4.

FIG. 14 is a diagram illustrating an example of a logic diagram LG3 of the similar device "V-51A" stored in the logic diagram storing device 2, and FIG. 15 is a diagram illustrating an example of a logic diagram LG4 of the target device "V-51B" stored in the logic diagram storing device 2.

In the case where the logic diagrams of the target device and the similar device are output to the logic diagram analyzing unit 3, those logic diagrams are used like the designated logic diagram described in the first embodiment. Operations since the logic diagrams of the target device and the similar device are output to the logic diagram analyzing unit 3 until they are overlapped and displayed in the display unit 8, are similar to those of the first embodiment, so the detailed operations will not be described.

Only the operation of the control logic comparing unit 4 in the case where the logic diagrams of the similar device "V-51A" and the target device "V-51B" are the logic diagrams LG3 and LG4 will be briefly described. In this case, an AND element 80$o$, an input point 80$p$, and an AND element 80$q$ exist only in the logic diagram LG3, and a NOT element 90$p$ and an OR element 90$o$ exist only in the logic diagram LG4. Therefore, the control logic comparing unit 4 extracts the differences as the control logic comparison information.

In the preferred embodiment, when the logic diagrams LG3 and LG4 are displayed in the display unit 8 by an operation similar to that of the first embodiment, at least one of the logic diagrams LG3 and LG4 can be edited.

FIG. 16 is a flowchart illustrating the operation of editing the logic diagrams LG3 and LG4 by the logic diagram editing device in the second embodiment. Hereinafter, the operation of editing the logic diagrams LG3 and LG4 by the logic diagram editing device will be described in detail with reference to FIGS. 16 to 19.

In step S301, the display control unit 10 switches a predetermined display method to display in the display unit 8 in accordance with a designation received in the operation input unit 9. That is, also in the logic diagram editing device and method of the preferred embodiment, in a manner similar to the first embodiment, a control of changing the predetermined display method to display in the display unit 8 is performed in accordance with an operation input in the operation input unit 9. Also in the second embodiment, three kinds of predetermined display methods are prepared, which are "common part display" illustrated in FIG. 17, "display of the difference of V-51A" illustrated in FIG. 18A, and "display of the difference of V-51B" illustrated in FIG. 18B.

Figure 17:
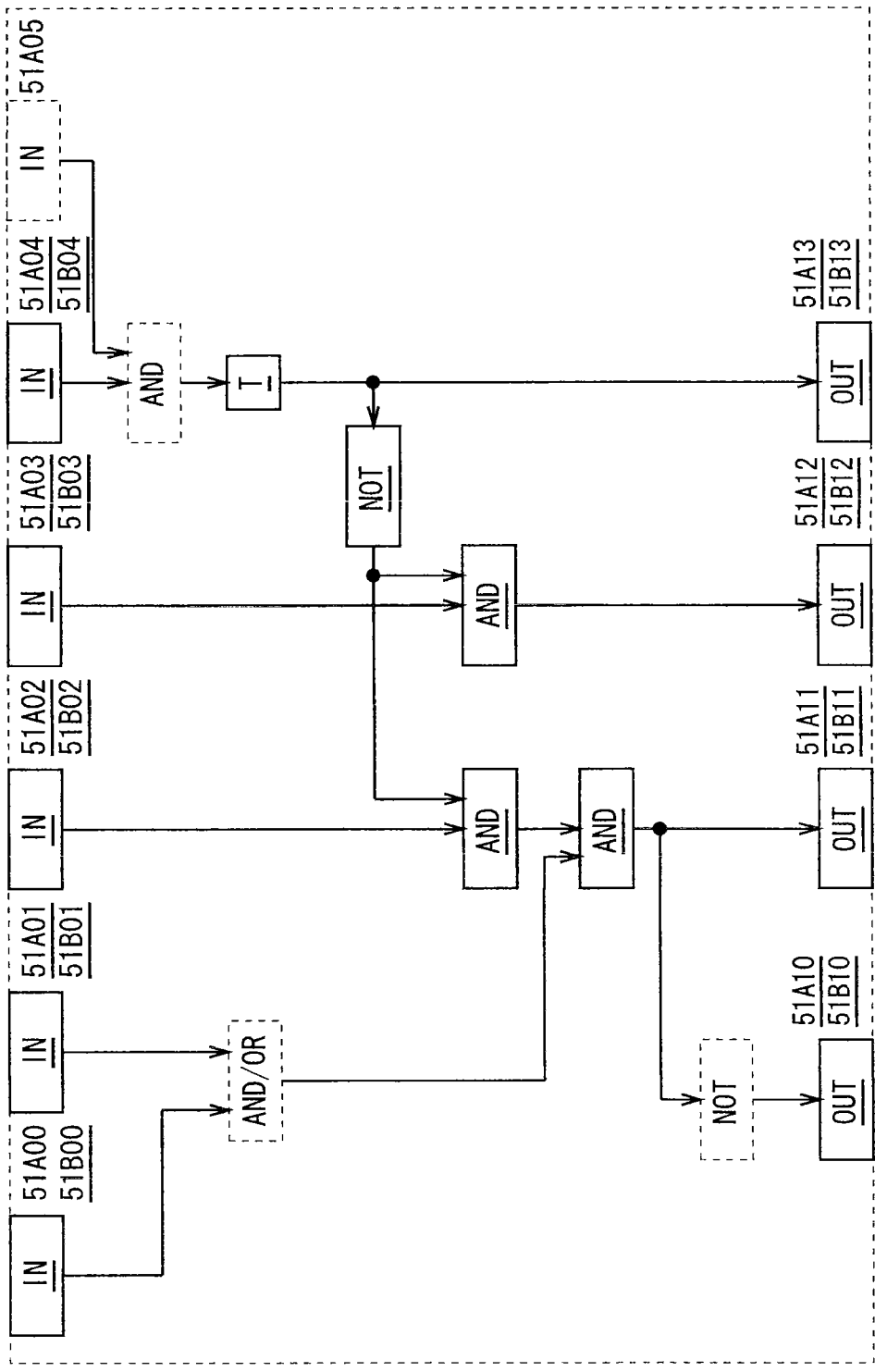
FIG. 17 is a diagram illustrating an example of overlapped display according to the second embodiment.

In the "common part display" illustrated in FIG. 17, the outer shape of the operation elements of the logics which are common to the logic diagrams LG3 and LG4 (that is, the operation element common part which is the common logic) is highlighted by a solid line. On the other hand, the outer shape of an operation element corresponding to the difference between the logic diagrams LG3 and LG4 (an operation element existing only in one of the logic diagrams) is displayed by a dotted line.

Figure 18A:
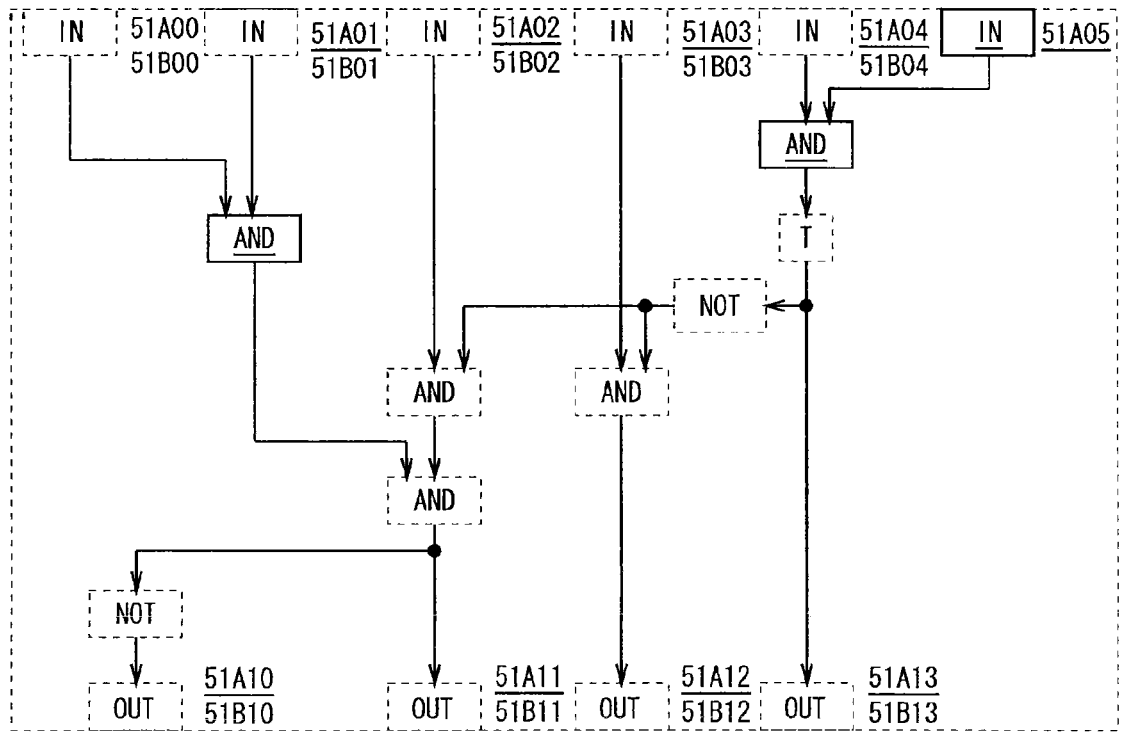
FIGS. 18A and 18B are diagrams illustrating an example of overlapped display according to the second embodiment.

In the "display of the difference of V-51A" illustrated in FIG. 18A, the outer shape of an operation element corresponding to the difference from the common logic of the logic diagram LG4 of the device "V-51B" is highlighted by a solid line. On the other hand, the outer shape of an operation element corresponding to the part common to the common logic of the logic diagram LG4 is displayed by a dotted line. The names of the input/output points and the like in the logic diagram LG3 are underlined so as to be highlighted. Accordingly, it becomes clear that the difference display performed in the display unit 8 is display of the difference of LG3.

Figure 18B:
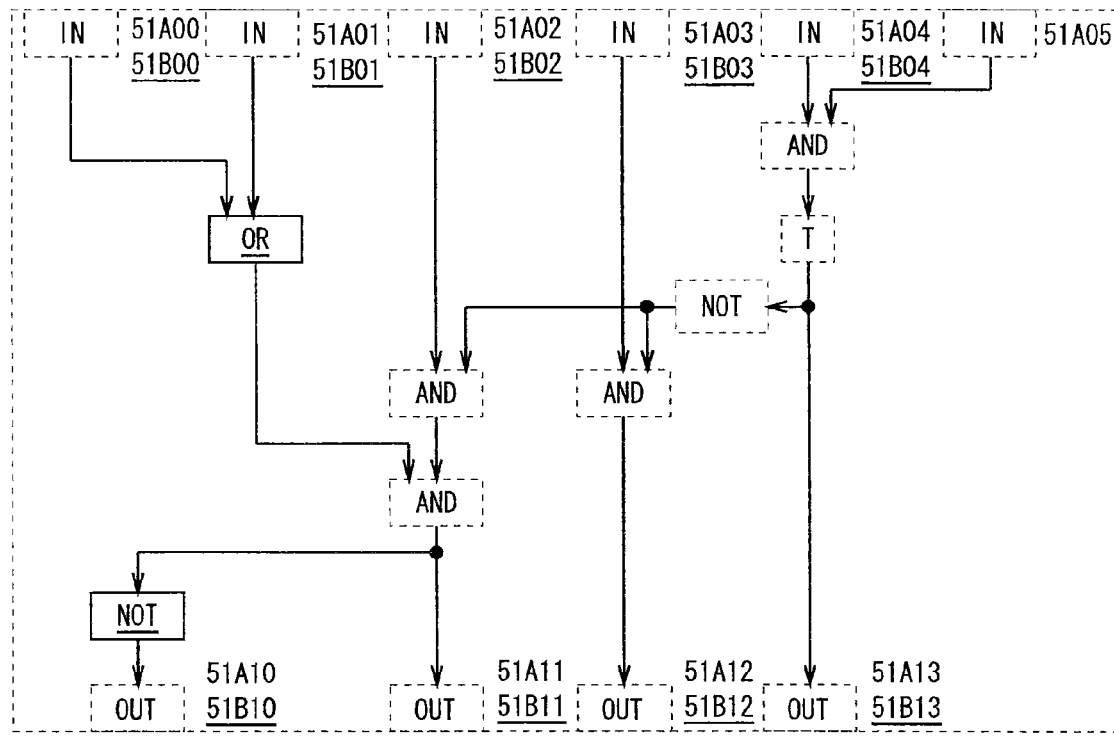

In the "display of the difference of V-51B" illustrated in FIG. 18B, the outer shape of an operation element corresponding to the difference from the common logic of the logic diagram LG3 is highlighted by a solid line. On the other hand, the outer shape of an operation element corresponding to the part common to the common logic of the logic diagram LG3 is displayed by a dotted line. The names of the input/output points and the like in the logic diagram LG4 are underlined so as to be highlighted.

Accordingly, it becomes clear that the difference display performed in the display unit 8 is display of the difference of LG4.

When the "common part display" is designated in the step S301, the display unit 8 is controlled to perform display as illustrated in FIG. 17.

In step S302, the logic diagram editing unit 14 determines the logic diagrams LG3 and LG4 to be edited in accordance with the predetermined display method designated in the step S301. In the case where "common part display" is designated, the logic diagram editing unit 14 determines both the logic diagram LG3 of the device "V-51A" and the logic diagram LG4 of the device "V-51B" as logic diagrams to be edited. In the case where "display of the difference of V-51A" is designated, the logic diagram editing unit 14 determines only the logic diagram LG3 of the device "V-51A" as a logic diagram to be edited. In the case where "display of the difference of V-51B" is designated, the logic diagram editing unit 14 determines only the logic diagram LG4 of the device "V-51B" as a logic diagram to be edited.

In step S303, the content of editing on the logic diagram determined in the step S302 (the logic diagram displayed in the display unit 8) is received from the logic diagram editor in the operation input unit 9.

Figure 19:
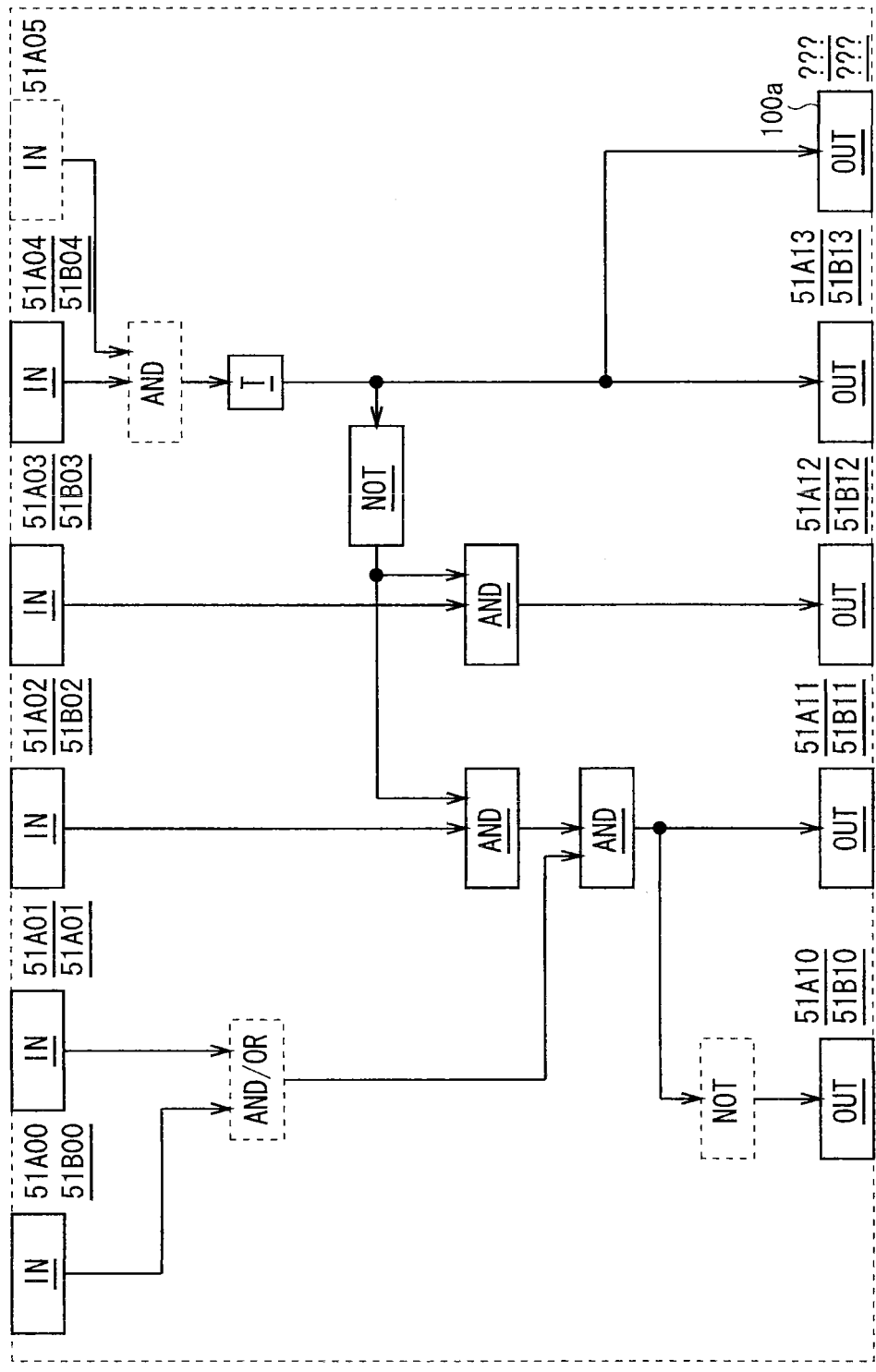
FIG. 19 is a diagram illustrating an example of editing of the logic diagram according to the second embodiment.

In step S304, on the basis of the received content of editing, the logic diagram determined in step S302 is edited. FIG. 19 illustrates an example in the case of adding one new output point 100a in the "common part display" state. In this case, in both of the logic diagram LG3 of the device "V-51A" and the logic diagram LG4 of the device "V-51B", editing of adding the output point 100a is performed. In addition, a connection line of connecting the output point 100a and an existing connection line is also added.

In step S305, the logic diagram storing unit 15 stores the logic diagram edited by the logic diagram editing unit 14 into the logic diagram storing device 2.

In the logic diagram editing device and method according to the preferred embodiment as described above, the diagrams are edited in a state where a plurality of logic diagrams in which operation elements are relocated while maintaining the control logics equivalently are overlapped, so that the diagrams can be compared and edited efficiently. Therefore, the time for comparison and editing can be reduced, and occurrence of a human error can be prevented, so that the quality of monitor and control process improves.

In the logic diagram editing device and method of the preferred embodiment, a designated logic diagram to be edited is determined in accordance with a predetermined display method instructed from the outside. Therefore, bulk editing and individual editing can be properly performed, so that a diagram can be compared and edited more efficiently.

In the logic diagram editing device and method of the preferred embodiment, a similar device having the same device characteristic as that of a target device is specified, and the logic diagrams of the target device and the similar device are overlapped and displayed. Therefore, the labor and time of searching and designating a logic diagram desired to be compared and collated (compared and edited) from a number of diagrams can be reduced.

In the logic diagram editing device and method of the preferred embodiment, the upstream written material analyzing unit 12 analyzes the system diagram DCI illustrating the mutual connection relations of the devices 51 in the monitor and control system 54 and, on the basis of the analysis result, obtains the device characteristic of a target device. Therefore, a similar device can be specified with high precision, and a similar logic diagram can be searched more appropriately.

In the logic diagram editing device and method of the preferred embodiment, the upstream written material analyzing unit 12 analyzes a device type and a control type and, on the basis of the analysis result, obtains the device characteristic of a target device. Therefore, a similar device can be specified with high precision, and a similar logic diagram can be searched.

Although the operation of editing the logic diagram of the device "V-51B" by the logic diagram editing device in the preferred embodiment has been described above, the logic diagram of another device 51 can be also edited by an operation similar to that on the device "V-51B".

In the preferred embodiment, it has been described that the device characteristics are the device specification list DC2 (the device type and the control type) and the system diagram DC1. The device characteristics may be only the device type and the control type or only the system diagram DC1. In this case, although the similarity precision of a similar device becomes lower than that in the case described in the foregoing preferred embodiment, the possibility of searching similar logic diagrams can be increased compared to the case where the device characteristic is not used.

The device characteristics are not limited to the three kinds; the device type, the control type, and the system diagram DC1. In the case where the device characteristics have to be obtained from a written material other than the system diagram DC1 and the device specification list DC2, by analyzing the written material by using the upstream written material analyzing unit 12, the device characteristics can be obtained in a manner similar to the above.

Although the logic diagram of a similar device is automatically searched and designated in the second embodiment, in a manner similar to the first embodiment, a plurality of logic diagrams designated from the outside may be edited without performing the automatic search and designation. Further, although two diagrams already generated are displayed and, after that, the editing operation is performed, it is also possible to newly generate a similar logic diagram by editing a logic diagram already generated and a diagram obtained by copying the generated logic diagram while overlapping the logic diagrams in a manner similar to the above.

In the present invention, the preferred embodiments can be freely combined or properly modified and omitted without departing from the scope of the present invention.

While the invention has been shown and described in detail, the foregoing description is in all aspects illustrative and not restrictive. It is therefore understood that numerous modifications and variations can be devised without departing from the scope of the invention.

What is claimed is:

1. A logic diagram processing device for processing a logic diagram expressing content of monitor and control performed on a device by a monitor and control system, comprising:
    a logic diagram designating unit which designates said logic diagram to be displayed;
    a logic diagram analyzing unit which analyzes a plurality of designated logic diagrams which are a plurality of said logic diagrams designated as objects to be displayed by said logic diagram designating unit;
    a control logic comparing unit which compares control logics of said plurality of designated logic diagrams on the basis of an analysis result of said logic diagram analyzing unit;
    an operation element location comparing unit which compares locations of operation elements disposed on said plurality of designated logic diagrams on the basis of a comparison result of said control logic comparing unit;
    a logic diagram relocating unit which relocates said operation elements while maintaining said control logics equivalently so that said operation elements as compared overlap in the case where said plurality of designated logic diagrams are overlapped, on the basis of a comparison result of said control logic comparing unit and a comparison result of said operation element location comparing unit;
    a logic diagram overlapping unit which overlaps said plurality of designated logic diagrams in which said operation elements are relocated by said logic diagram relocating unit;
    a display unit which displays said plurality of designated logic diagrams overlapped by said logic diagram overlapping unit in a predetermined display method by which a common part or a difference of the operation elements can be discriminated; and
    a display control unit which switches the predetermined display method to display in said display unit in accordance with an instruction from outside.

2. The logic diagram processing device according to claim 1, further comprising:
    a logic diagram editing unit which edits at least one of said plurality of designated logic diagrams displayed in said display unit in accordance with an instruction from the outside; and
    a logic diagram storing device which stores said designated logic diagram edited by said logic diagram editing unit.

3. The logic diagram processing device according to claim 2, wherein said logic diagram editing unit determines said designated logic diagram to be edited in accordance with said predetermined display method instructed from said outside.

4. The logic diagram processing device according to claim 1, further comprising:
    an upstream written material analyzing unit which obtains an upstream written material of a target device which is an object to be controlled by said logic diagram designated by said logic diagram designating unit from among upstream written materials which are information on a plurality of target devices, and analyzes the obtained upstream written material; and
    a similar device searching unit which specifies a similar device similar to said target device on the basis of an analysis result of said upstream written material analyzing unit,
    wherein said logic diagram of said similar device is used as said designated logic diagram.

5. The logic diagram processing device according to claim 4, wherein said upstream written material includes a system diagram illustrating mutual connection relations of said devices, and
    said upstream written material analyzing unit analyzes said system diagram.

6. The logic diagram processing device according to claim 4, wherein said upstream written material includes a device type indicative of a type of said device and a control type indicative of a method of controlling said device, and
    said upstream written material analyzing unit analyzes said device type and said control type.

7. A logic diagram processing method of processing a logic diagram expressing content of monitor and control performed on a device by a monitor and control system, comprising:
    (a) a step of designating said logic diagram to be displayed;
    (b) a step of analyzing a plurality of designated logic diagrams which are a plurality of said logic diagrams designated as objects to be displayed in said step (a);
    (c) a step of comparing control logics of said plurality of designated logic diagrams on the basis of an analysis result of said step (b);
    (d) a step of comparing locations of operation elements disposed on said plurality of designated logic diagrams on the basis of a comparison result in said step (c);
    (e) a step of relocating said operation elements while maintaining said control logics equivalently so that said operation elements as compared overlap in the case where said plurality of designated logic diagrams are overlapped, on the basis of a comparison result in said step (c) and a comparison result in said step (d);
    (f) a step of overlapping said plurality of designated logic diagrams in which said operation elements are relocated in said step (e); and
    (g) a step of displaying said plurality of designated logic diagrams overlapped in said step (f) in a predetermined display method by which a common part or a difference of the operation elements can be discriminated,
    wherein the predetermined display method to display in said step (g) is switched in accordance with an instruction from outside.

* * * * *